United States Patent
S et al.

(10) Patent No.: US 12,199,858 B2
(45) Date of Patent: Jan. 14, 2025

(54) METHODS AND APPARATUS FOR TRAFFIC CONTROL FOR APPLICATION-INDEPENDENT SERVICE MESH

(71) Applicant: INTEL CORPORATION, Santa Clara, CA (US)

(72) Inventors: Deepak S, Bangalore (IN); Kannan Babu Ramia, Bangalore (IN); Palaniappan Ramanathan, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/711,964

(22) Filed: Apr. 1, 2022

(65) Prior Publication Data

US 2022/0224637 A1    Jul. 14, 2022

(51) Int. Cl.
| | | |
|---|---|---|
| *H04L 45/30* | (2022.01) | |
| *H04L 9/40* | (2022.01) | |
| *H04L 45/02* | (2022.01) | |
| *H04L 47/125* | (2022.01) | |

(52) U.S. Cl.
CPC .............. *H04L 45/30* (2013.01); *H04L 45/02* (2013.01); *H04L 47/125* (2013.01); *H04L 63/101* (2013.01)

(58) Field of Classification Search
CPC ....... H04L 45/30; H04L 45/02; H04L 47/125; H04L 63/101; H04L 63/0281; H04L 63/1408
See application file for complete search history.

(56) References Cited

U.S. PATENT DOCUMENTS

| | | | | |
|---|---|---|---|---|
| 10,764,244 | B1* | 9/2020 | Mestery | H04L 67/10 |
| 10,958,662 | B1* | 3/2021 | Sole | H04L 63/0853 |
| 11,134,058 | B1* | 9/2021 | Sole | H04W 12/12 |
| 11,153,412 | B1* | 10/2021 | Varadan | H04L 67/133 |
| 11,218,538 | B2 | 1/2022 | Bernat et al. | |
| 11,240,155 | B2 | 2/2022 | Bernat et al. | |
| 11,457,040 | B1* | 9/2022 | Sole | H04L 63/101 |
| 11,457,080 | B1* | 9/2022 | Meduri | H04L 67/60 |
| 11,522,948 | B1* | 12/2022 | Kairali | H04L 67/1012 |
| 11,570,279 | B1* | 1/2023 | Kairali | H04L 41/0886 |
| 2015/0317169 | A1* | 11/2015 | Sinha | G06F 9/4416 713/2 |

(Continued)

*Primary Examiner* — Jimmy H Tran
(74) *Attorney, Agent, or Firm* — Hanley, Flight & Zimmerman, LLC

(57) ABSTRACT

Methods, apparatus, systems, and articles of manufacture are disclosed for traffic control for application-independent service mesh. In one example, processor circuitry to perform operations to instantiate ingress traffic management circuitry to receive ingress traffic events, at least one of the ingress traffic events to request access to a target microservice running on the second endpoint. The processor circuitry further performs operations to instantiate virtual service authorization circuitry to perform a look up of an authorization policy to the target microservice in the microservice catalog. Finally, the processor circuitry performs operations to instantiate endpoint selection circuitry to select the second endpoint to service the ingress traffic event in response to the authorization policy allowing access to the target microservice.

25 Claims, 18 Drawing Sheets

(56) References Cited

U.S. PATENT DOCUMENTS

| | | | | |
|---|---|---|---|---|
| 2017/0366606 | A1* | 12/2017 | Ben-Shaul | G06F 3/061 |
| 2018/0285166 | A1* | 10/2018 | Roy | H04L 41/0895 |
| 2019/0141121 | A1* | 5/2019 | Bernat | H04L 41/5051 |
| 2019/0222518 | A1* | 7/2019 | Bernat | H04L 41/5051 |
| 2019/0273746 | A1* | 9/2019 | Coffing | G06Q 20/40 |
| 2020/0133795 | A1* | 4/2020 | Rhodes | G06F 11/1469 |
| 2020/0226009 | A1* | 7/2020 | Bachmutsky | G06F 9/5038 |
| 2021/0058327 | A1* | 2/2021 | Mariappan | H04L 41/5025 |
| 2021/0314365 | A1* | 10/2021 | Smith | G06F 11/301 |
| 2021/0392477 | A1* | 12/2021 | Taft | H04W 12/37 |
| 2022/0103618 | A1* | 3/2022 | Pinheiro | H04L 67/60 |
| 2022/0109741 | A1* | 4/2022 | Chen | H04L 69/40 |
| 2022/0116478 | A1* | 4/2022 | Biederman | H04L 67/5682 |
| 2022/0182441 | A1 | 6/2022 | Bernat et al. | |
| 2022/0210073 | A1 | 6/2022 | Bernat et al. | |
| 2022/0225065 | A1* | 7/2022 | Doken | H04L 41/5051 |
| 2022/0269601 | A1* | 8/2022 | Monteith | G06F 3/0643 |
| 2022/0334864 | A1* | 10/2022 | K N | G06F 8/61 |
| 2022/0365703 | A1* | 11/2022 | Darji | H04L 67/1097 |
| 2023/0239326 | A1* | 7/2023 | Zhang | H04L 63/20 726/1 |
| 2023/0336414 | A1* | 10/2023 | Miriyala | H04L 45/42 |
| 2024/0031908 | A1* | 1/2024 | Grewal | H04L 45/38 |
| 2024/0048471 | A1* | 2/2024 | Wennerstr?m | H04L 43/50 |
| 2024/0236017 | A1* | 7/2024 | Guim Bernat | H04L 41/0897 |

\* cited by examiner

METHODS AND APPARATUS FOR TRAFFIC CONTROL FOR APPLICATION-INDEPENDENT SERVICE MESH

FIELD OF THE DISCLOSURE

This disclosure relates generally to service mesh frameworks and, more particularly, to traffic control for application-independent service mesh.

BACKGROUND

In recent years, service meshes have proliferated in edge networking. A service mesh is a network of microservices that makes up an application and the interaction between the microservices. For example, a retail website selling goods is considered an application and many of the product pages (e.g., pages with reviews, product details, etc.) as well as pages offering point of sale interactions and product support, among others, may each constitute a microservice. When a customer clicks on a product to open up such pages with more information about the product, additional microservices associated with those sub-pages are utilized for such requests. Mesh networks utilize a framework to create, manage, and deploy application independent networks for micro services. ISTIO® is a popular framework to implement mesh networks, although several other frameworks exist.

Figure 1:
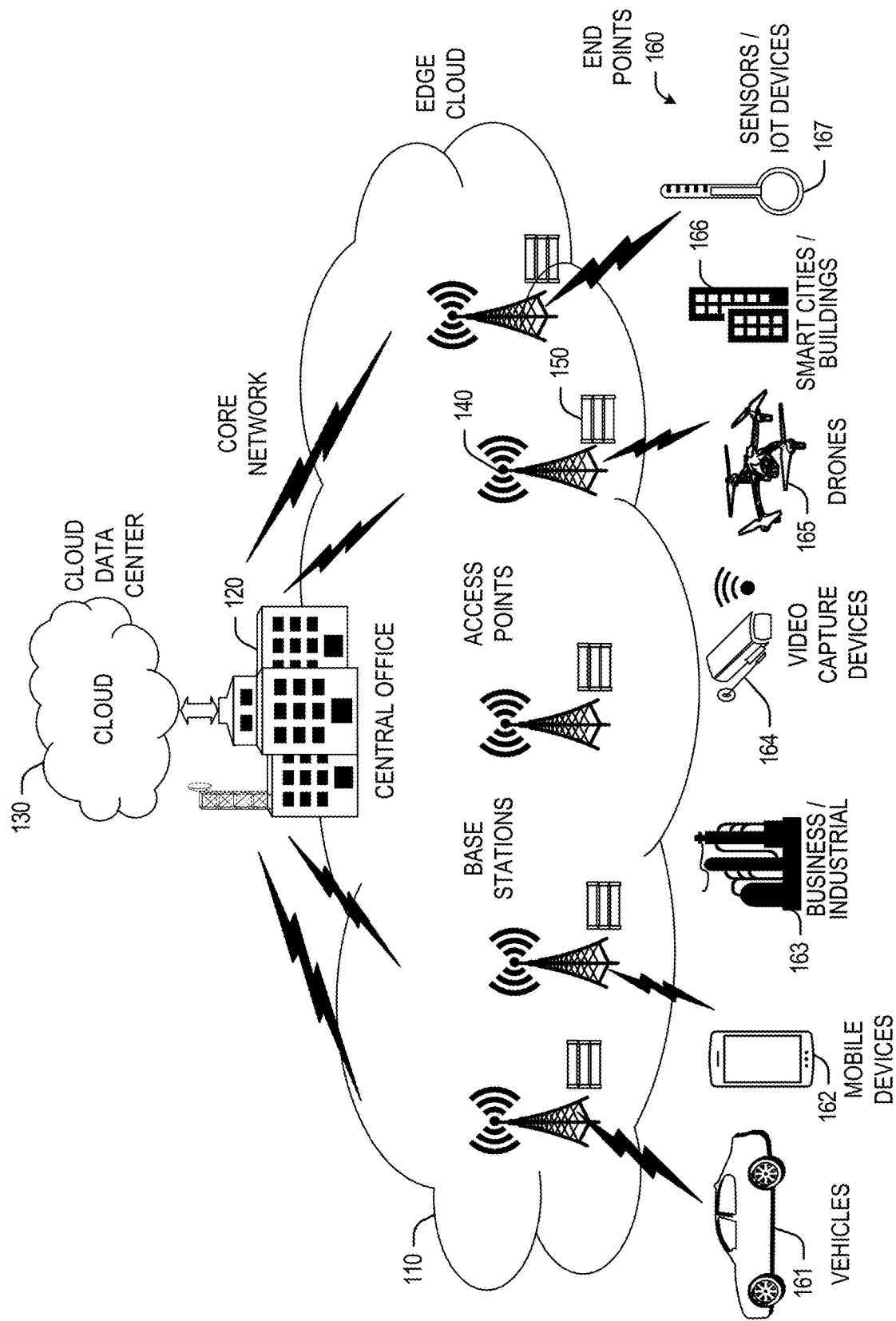
FIG. 1 is a block diagram showing an overview of a configuration for edge computing, which includes a layer of processing referred to in many of the following examples as an "edge cloud."

The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In an edge platform with limited resources, it is common to run multiple applications from different independent software vendors (ISVs) on the same edge platform. Namespaces are used in edge networking to provide a mechanism for isolating groups of resources within a single edge cluster. An edge cluster is generally a group of edge devices/endpoints that have a co-location of compute resources due to a need for more scalability/capability than a single edge device/endpoint can provide. Typical namespaces can be used to build virtual tenancy between applications. Virtual tenancy allows for building a set of customized resources per application instead of a universal standard set of resources. With an edge producer and consumer model, where different endpoints and different namespaces may support each other by producing and/or consuming resources for each other, there is a need for the microservices of an application running in a first namespace to communicate with the microservices of other applications running in other namespaces.

An application developer may use a service alias name for microservice communication in an edge network to enable the discovery of services (e.g., microservices) offered by another vendor. A service alias names allows the stacking of microservices in a host endpoint or cluster by creating an alternate name to the normal name where both names are defined in a domain name system (DNS) server and requests to either name can reach the host.

A service mesh framework functions as the infrastructure to deploy and maintain microservices in an edge network among clusters and endpoints. There are a number of service mesh framework options, but ISTIO is the most popular, thus, the examples described herein will utilize ISTIO as a baseline description, although it should be understood that any one or more other service mesh frameworks, with corresponding architecture, could be used in place of ISTIO.

ISTIO can provide application independent fine-grained control over traffic behavior including automatic load balancing across endpoints (e.g., PODs) on a single namespace. But if application microservices use aliasing or have a need to communicate with a microservice in another namespace, current ISTIO implementations use predefined clusters called "Passthoughcluster" and/or "BlackHoleCluster," deployed in the ISTIO control plane, to resolve Internet Protocol (IP) addresses of the microservices and/or clusters in the other namespace(s). This is done instead of accessing the endpoint/POD directly, which results in a loss of fine-grained traffic control because the Passthoughcluster/BlackHoleCluster may assign the request to a random endpoint in the other namespace (e.g., such as in a round-robin load balancing approach or otherwise) instead of allowing the source of the request to have the authority to access a specific endpoint in the other namespace. For ease of explanation, an access/request from a cluster/endpoint in a first namespace to a destination cluster/endpoint in the same namespace will be referred to as a "local namespace" access/request and an access/request from a cluster/endpoint in a first namespace to a destination cluster/endpoint in another namespace will be referred to as a "remote namespace" access/request.

Additionally, if the application uses aliasing, even if all microservices are running in the same namespace, current ISTIO implementations still use Passthoughcluster/BlackHoleCluster to resolve the microservice/endpoint IP address (or cluster IP address) instead of allowing direct access to the endpoint. Thus, aliasing the IP address, regardless of the location of the requested microservice/endpoint/cluster, results in a loss of fine-grained control as well.

Examples disclosed herein provide for traffic control for application-independent service mesh. In some examples, an enhanced proxy implemented within the ISTIO framework is described. In some examples, the enhanced proxy includes an ability to discover microservices across namespaces with direct access to endpoints and communicate between microservices across namespaces also with direct access to endpoints, which provides fine-grained control.

ISTIO includes a Pilot component that manages and configures all proxy instances deployed in a particular service mesh. Pilot allows the specification of rules to route traffic between proxies and maintains an accurate and authoritative model of all the services (e.g., microservices) in the mesh. The model of all the services provides each proxy the knowledge of the other proxy instances in the mesh. In some examples, the Pilot component is enhanced to insert the fully qualified domain names (FQDNs) and corresponding endpoints of microservices deployed across namespaces. In some examples, the Pilot component (or another component) watches the coreDNS (core domain name system) server for a list of aliases of corresponding microservice FQDNs. In some examples, the Pilot component inserts a new updated configuration to a proxy to select endpoints across namespaces as well as to select endpoints through the use of aliasing. In turn, in some examples, a proxy (e.g., a proxy instance configured and instantiated by the Pilot component) is enhanced to handle destination rules for microservices communications across namespaces and is enhanced to handle destination rules for microservices communications using aliasing.

An enhanced configuration implemented in an example proxy allows the proxy to lookup a table that lists the endpoints of the microservices in other namespaces or with aliasing. As described herein the table will be referred to as a "microservice catalog" and will be described in greater detail below. In some examples, to efficiently allow different edge domains (e.g., edge domains with different namespaces owned by different operators) to cooperate, a request coming from a device/customer connected to a first edge domain namespace may be executed at a destination endpoint that can process the request but is hosted in a different edge domain namespace.

FIG. 1 is a block diagram 100 showing an overview of a configuration for edge computing, which includes a layer of processing referred to in many of the following examples as an "edge cloud." As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
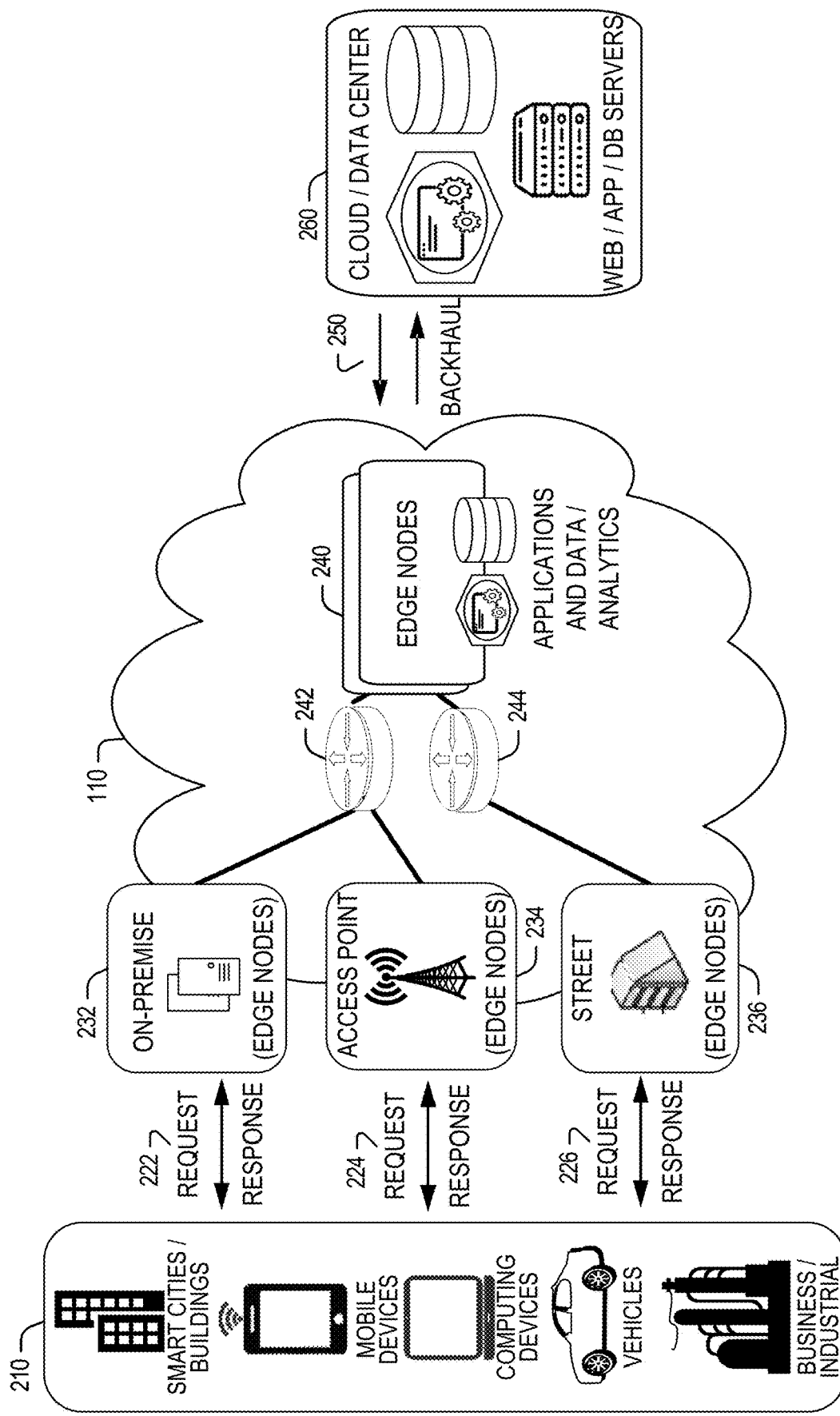
FIG. 2 illustrates various client endpoints (in the form of mobile devices, computers, autonomous vehicles, business computing equipment, industrial processing equipment), exchange requests, and responses that are specific to the type of endpoint network aggregation.

In FIG. 2, various client endpoints 210 (in the form of mobile devices, computers, autonomous vehicles, business computing equipment, industrial processing equipment) exchange requests and responses that are specific to the type of endpoint network aggregation. For instance, client endpoints 210 may obtain network access via a wired broadband network, by exchanging requests and responses 222 through an on-premise network system 232. Some client endpoints 210, such as mobile computing devices, may obtain network access via a wireless broadband network, by exchanging requests and responses 224 through an access point (e.g., a cellular network tower) 234. Some client endpoints 210, such as autonomous vehicles may obtain network access for requests and responses 226 via a wireless vehicular network through a street-located network system 236. However, regardless of the type of network access, the TSP may deploy aggregation points 242, 244 within the edge cloud 110 to aggregate traffic and requests. Thus, within the edge cloud 110, the TSP may deploy various compute and storage resources, such as at edge aggregation nodes 240, to provide requested content. The edge aggregation nodes 240 and other systems of the edge cloud 110 are connected to a cloud or data center 260, which uses a backhaul network 250 to fulfill higher-latency requests from a cloud/data center for websites, applications, database servers, etc. Additional or consolidated instances of the edge aggregation nodes 240 and the aggregation points 242, 244, including those deployed on a single server framework, may also be present within the edge cloud 110 or other areas of the TSP infrastructure.

Figure 3:
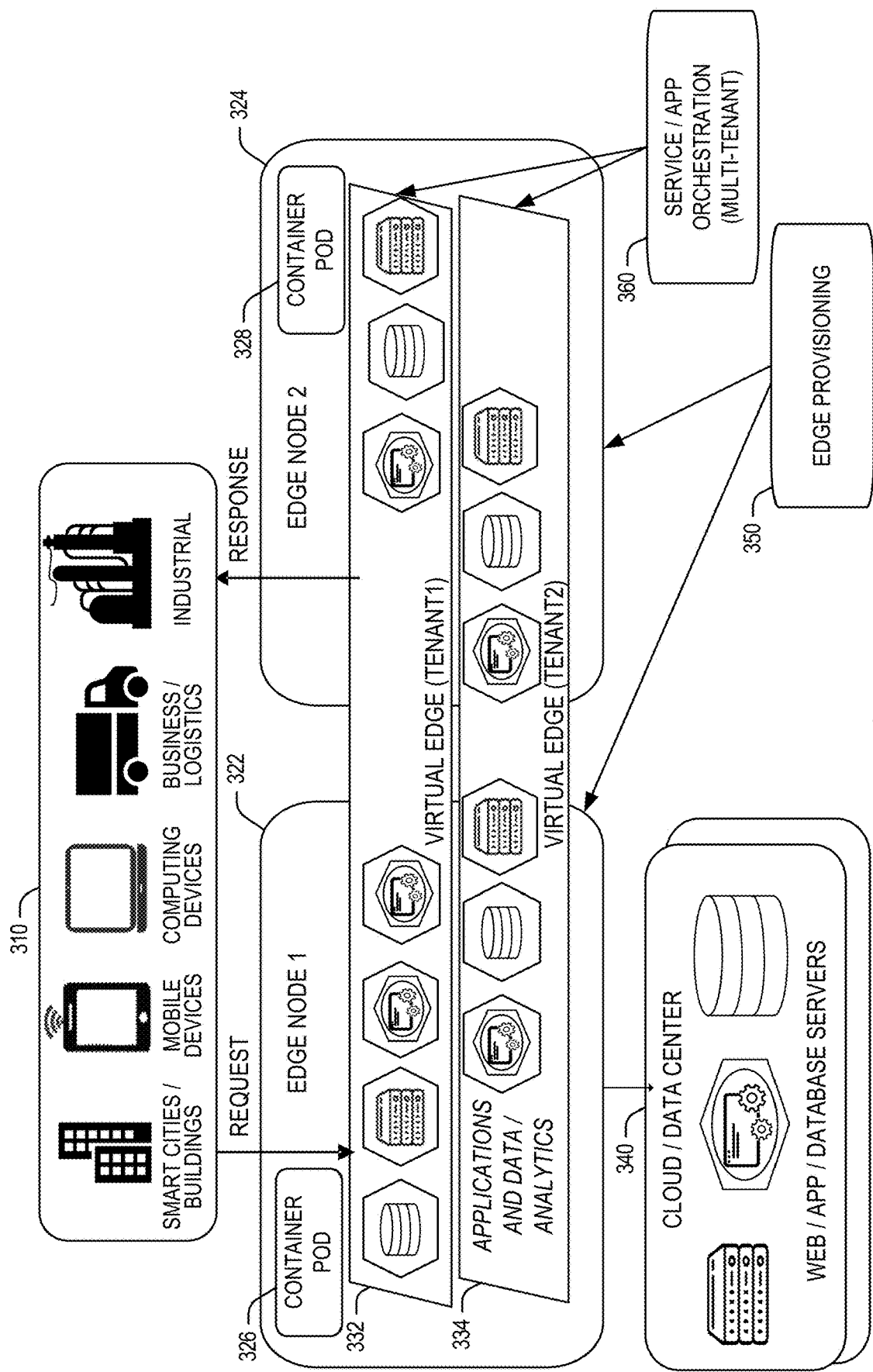
FIG. 3 illustrates deployment and orchestration for virtualized and container-based edge configurations across an edge computing system operated among multiple edge nodes and multiple tenants (e.g., users, providers) which use such edge nodes.

FIG. 3 illustrates deployment and orchestration for virtualized and container-based edge configurations across an edge computing system operated among multiple edge nodes and multiple tenants (e.g., users, providers) which use such edge nodes. Specifically, FIG. 3 depicts coordination of a first edge node 322 and a second edge node 324 in an edge computing system 300, to fulfill requests and responses for various client endpoints 310 (e.g., smart cities/building systems, mobile devices, computing devices, business/logistics systems, industrial systems, etc.), which access various virtual edge instances. Here, the virtual edge instances 332, 334 provide edge compute capabilities and processing in an edge cloud, with access to a cloud/data center 340 for higher-latency requests for websites, applications, database servers, etc. However, the edge cloud enables coordination of processing among multiple edge nodes for multiple tenants or entities.

In the example of FIG. 3, these virtual edge instances include: a first virtual edge 332, offered to a first tenant (Tenant 1), which offers a first combination of edge storage, computing, and services; and a second virtual edge 334, offered to a second tenant (Tenant 2), which offers a second combination of edge storage, computing, and services. The virtual edge instances 332, 334 are distributed among the edge nodes 322, 324, and may include scenarios in which a request and response are fulfilled from the same or different edge nodes. The configuration of the edge nodes 322, 324 to operate in a distributed yet coordinated fashion occurs based on edge provisioning functions 350. The functionality of the edge nodes 322, 324 to provide coordinated operation for applications and services, among multiple tenants, occurs based on orchestration functions 360.

It should be understood that some of the devices in 310 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 322, 324 may operate as security feature enforcement points for local resources allocated to multiple tenants per node. Additionally, tenant runtime and application execution (e.g., in instances 332, 334) may serve as an enforcement point for a security feature that creates a virtual edge abstraction of resources spanning potentially multiple physical hosting platforms. Finally, the orchestration functions 360 at an orchestration entity may operate as a security feature enforcement point for marshalling resources along tenant boundaries.

edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to edge Nodes. Cloud computing nodes often use containers, FaaS engines, servlets, servers, or other computation abstraction that may be partitioned according to a DICE layering and fan-out structure to support a RoT context for each. Accordingly, the respective RoTs spanning devices 310, 322, and 340 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 3. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload, etc.) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 322, 324 may implement the use of containers, such as with the use of a container "pod" 326, 328 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 332, 334 are partitioned according to the needs of each container.

With the use of container pods, a pod controller oversees the partitioning and allocation of containers and resources. The pod controller receives instructions from an orchestrator (e.g., orchestrator 360) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, the pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 360 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 4:
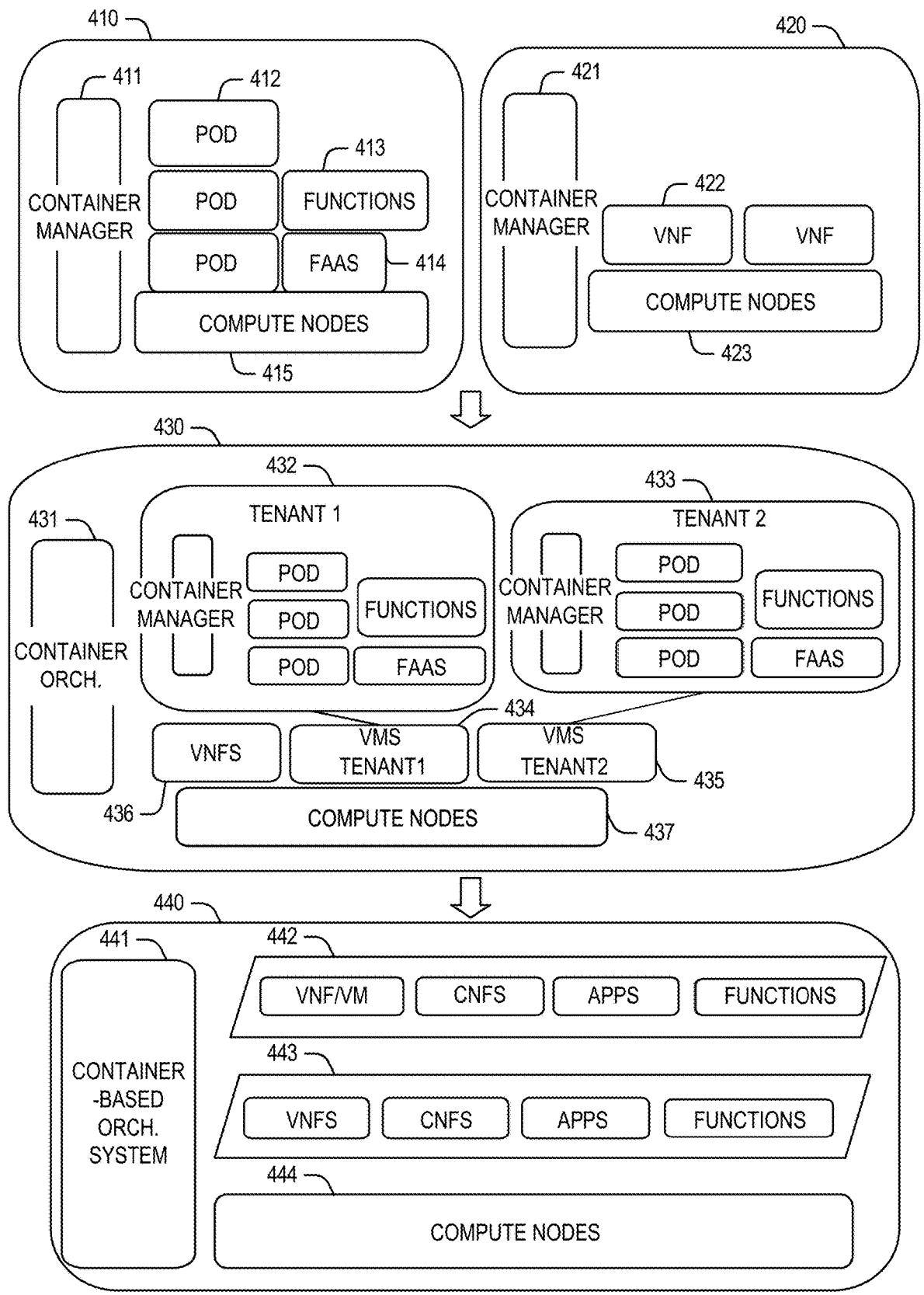
FIG. 4 illustrates additional example compute arrangements deploying containers in an edge computing system.

FIG. 4 illustrates additional example compute arrangements deploying containers in an edge computing system. As a simplified example, system arrangements 410, 420 depict settings in which a pod controller (e.g., container managers 411, 421, and container orchestrator 431) is adapted to launch containerized pods, functions, and FaaS instances through execution via compute nodes (415 in arrangement 410), or to separately execute containerized virtualized network functions through execution via compute nodes (423 in arrangement 420). This arrangement is adapted for use of multiple tenants in system arrangement 430 (using compute nodes 437), where containerized pods (e.g., pods 412), functions (e.g., functions 413, VNFs 422, 436), and functions-as-a-service instances (e.g., FaaS instance 414) are launched within virtual machines (e.g., VMs 434, 435 for tenants 432, 433) specific to respective tenants (aside the execution of virtualized network functions). This arrangement is further adapted for use in system arrangement 440, which provides containers 442, 443, or execution of the various functions, applications, and functions on compute nodes 444, as coordinated by an container-based orchestration system 441.

The system arrangements depicted in FIG. 4 provide an architecture that treats VMs, Containers, and Functions equally in terms of application composition (and resulting applications are combinations of these three ingredients). Each ingredient may involve use of one or more accelerator (e.g., FPGA, ASIC, etc.) components as a local backend. In this manner, applications can be split across multiple edge owners, coordinated by an orchestrator.

In the context of FIG. 4, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SD Si) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 5:
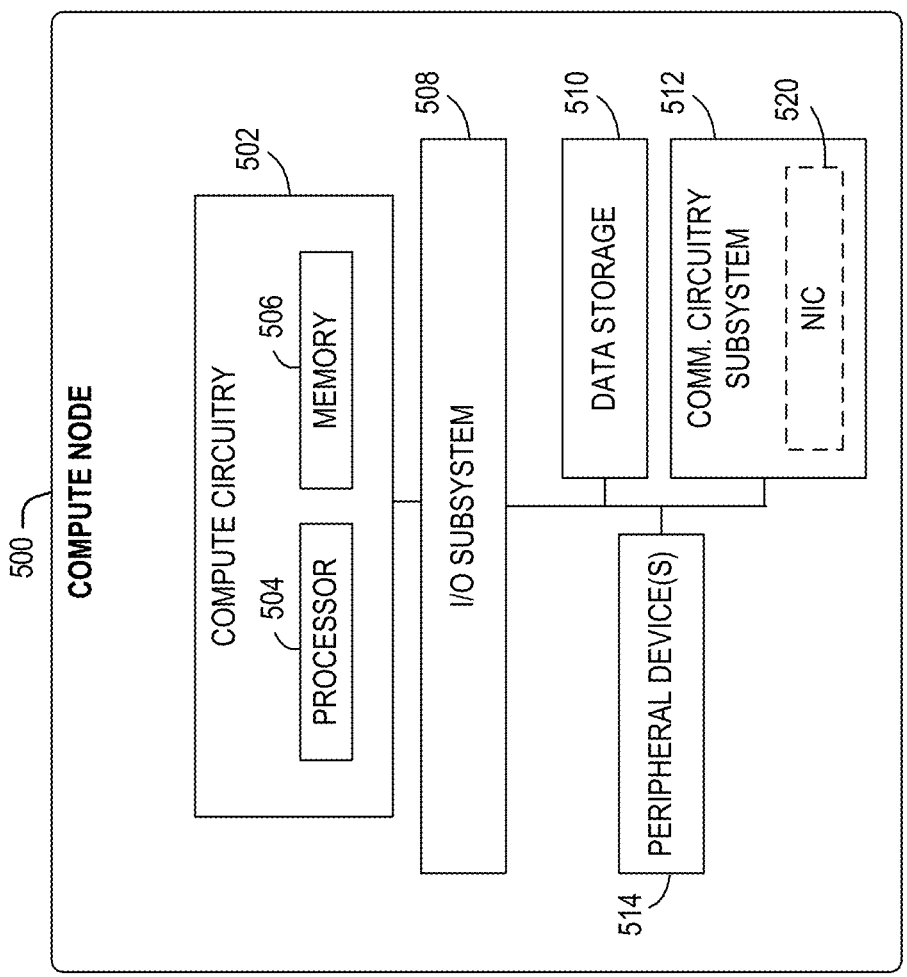
FIG. 5 provides an overview of example components for compute deployed at a compute node in an edge computing system.

FIG. 5 provides an overview of example components for compute deployed at a compute node in an edge computing system.

Figure 6:
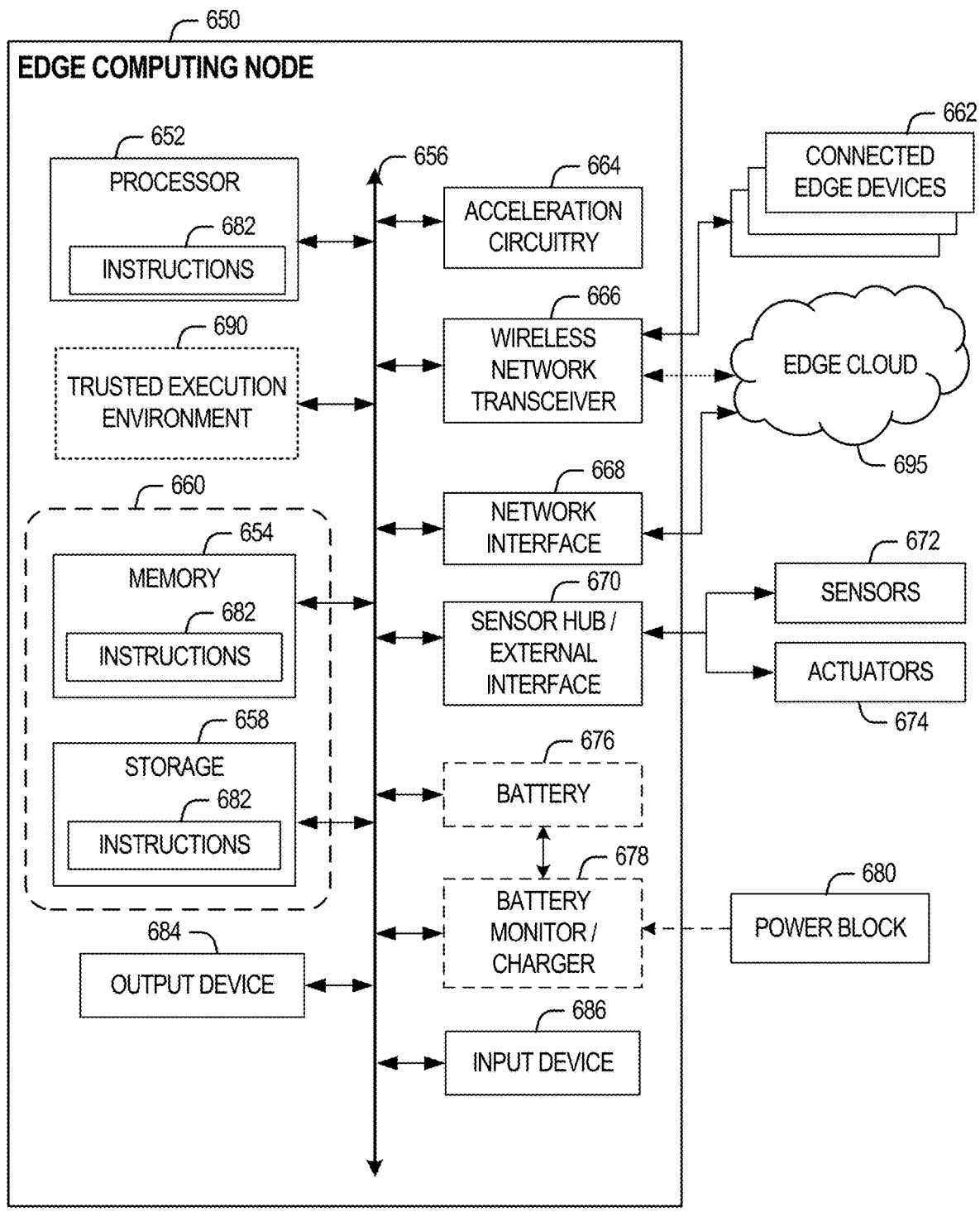
FIG. 6 provides a further overview of example components within a computing device in an edge computing system.

FIG. 6 provides a further overview of example components within a computing device in an edge computing system.

In further examples, any of the compute nodes or devices discussed with reference to the present edge computing systems and environment may be fulfilled based on the components depicted in FIGS. 5 and 6. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 5, an edge compute node 500 includes a compute engine (also referred to herein as "compute circuitry") 502, an input/output (I/O) subsystem (also referred to herein as "I/O circuitry") 508, data storage (also referred to herein as "data storage circuitry") 510, a communication circuitry subsystem 512, and, optionally, one or more peripheral devices (also referred to herein as "peripheral device circuitry") 514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 500 may be embodied as any type of engine, device, or collection of devices capable of performing various compute functions. In some examples, the compute node 500 may be embodied as a single device such as an integrated circuit, an embedded system, a field-programmable gate array (FPGA), a system-on-a-chip (SOC), or other integrated system or device. In the illustrative example, the compute node 500 includes or is embodied as a processor (also referred to herein as "processor circuitry") 504 and a memory (also referred to herein as "memory circuitry") 506. The processor 504 may be embodied as any type of processor(s) capable of performing the functions described herein (e.g., executing an application). For example, the processor 504 may be embodied as a multi-core processor(s), a microcontroller, a processing unit, a specialized or special purpose processing unit, or other processor or processing/controlling circuit.

In some examples, the processor 504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 504 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 504 may work in coordination with each other to execute many types of operations and instructions within and on behalf of the compute node 500.

The memory 506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 506 may be integrated into the processor 504. The memory 506 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 502 is communicatively coupled to other components of the compute node 500 via the I/O subsystem 508, which may be embodied as circuitry and/or components to facilitate input/output operations with the compute circuitry 502 (e.g., with the processor 504 and/or the main memory 506) and other components of the compute circuitry 502. For example, the I/O subsystem 508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 508 may form a portion of a system-on-a-chip (SoC) and be incorporated, along with one or more of the processor 504, the memory 506, and other components of the compute circuitry 502, into the compute circuitry 502.

The one or more illustrative data storage devices/disks 510 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 510 may include a system partition that stores data and firmware code for the data storage device/disk 510. Individual data storage devices/disks 510 may also include one or more operating system partitions that store data files and executables for operating systems depending on, for example, the type of compute node 500.

The communication circuitry 512 may be embodied as any communication circuit, device, or collection thereof, capable of enabling communications over a network between the compute circuitry 502 and another compute device (e.g., an edge gateway of an implementing edge computing system). The communication circuitry 512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 512 includes a network interface controller (NIC) 520, which may also be referred to as a host fabric interface (HFI). The NIC 520 may be embodied as one or more add-in-boards, daughter cards, network interface cards, controller chips, chipsets, or other devices that may be used by the compute node 500 to connect with another compute device (e.g., an edge gateway node). In some examples, the NIC 520 may be embodied as part of a system-on-a-chip (SoC) that includes one or more processors, or included on a multichip package that also contains one or more processors. In some examples, the NIC 520 may include a local processor (not shown) and/or a local memory (not shown) that are both local to the NIC 520. In such examples, the local processor of the NIC 520 may be capable of performing one or more of the functions of the compute circuitry 502 described herein. Additionally, or alternatively, in such examples, the local memory of the NIC 520 may be integrated into one or more components of the client compute node at the board level, socket level, chip level, and/or other levels.

Additionally, in some examples, a respective compute node 500 may include one or more peripheral devices 514. Such peripheral devices 514 may include any type of peripheral device found in a compute device or server such as audio input devices, a display, other input/output devices, interface devices, and/or other peripheral devices, depending on the particular type of the compute node 500. In further examples, the compute node 500 may be embodied by a respective edge compute node (whether a client, gateway, or aggregation node) in an edge computing system or like forms of appliances, computers, subsystems, circuitry, or other components.

In a more detailed example, FIG. 6 illustrates a block diagram of an example of components that may be present in an edge computing node 650 for implementing the techniques (e.g., operations, processes, methods, and methodologies) described herein. This edge computing node 650 provides a closer view of the respective components of node 500 when implemented as or as part of a computing device (e.g., as a mobile device, a base station, server, gateway, etc.). The edge computing node 650 may include any combination of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 650, or as components otherwise incorporated within a chassis of a larger system.

The edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on Bluetooth Low Energy (BLE), or another low power radio, to save power. More distant connected edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an edge cloud 695) via local or wide area network protocols. The wireless network transceiver 666 may be a low-power wide-area (LPWA) transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 695 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD9016 family from Texas Instruments of Dallas, TX The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable storage medium" is expressly defined to include any type of computer-readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

While the illustrated examples of FIG. 5 and FIG. 6 include example components for a compute node and a computing device, respectively, examples disclosed herein are not limited thereto. As used herein, a "computer" may include some or all of the example components of FIGS. 5 and/or 6 in different types of computing environments. Example computing environments include edge computing devices (e.g., edge computers) in a distributed networking arrangement such that particular ones of participating edge computing devices are heterogenous or homogeneous devices. As used herein, a "computer" may include a personal computer, a server, user equipment, an accelerator, etc., including any combinations thereof. In some examples, distributed networking and/or distributed computing includes any number of such edge computing devices as illustrated in FIGS. 5 and/or 6, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 5 and/or 6 to satisfy functional objectives of distributed computing tasks. In some examples, the term "compute node" or "computer" only includes the example processor 604, memory 606 and I/O subsystem 608 of FIG. 5. In some examples, one or more objective functions of a distributed computing task(s) rely on one or more alternate devices/structure located in different parts of an edge networking environment, such as devices to accommodate data storage (e.g., the example data storage 610), input/output capabilities (e.g., the example peripheral device(s) 614), and/or network communication capabilities (e.g., the example NIC 620).

In some examples, computers operating in a distributed computing and/or distributed networking environment (e.g., an edge network) are structured to accommodate particular objective functionality in a manner that reduces computational waste. For instance, because a computer includes a subset of the components disclosed in FIGS. 5 and 6, such computers satisfy execution of distributed computing objective functions without including computing structure that would otherwise be unused and/or underutilized. As such, the term "computer" as used herein includes any combination of structure of FIGS. 5 and/or 6 that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 5 and 6, computing devices include operating systems. As used herein, an "operating system" is software to control example computing devices, such as the example edge compute node 600 of FIG. 5 and/or the example edge compute node 650 of FIG. 6. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first edge compute node may be the same or different than an example operating system on a second edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first edge compute node includes a real-time operating system having particular performance expectations of responsivity to dynamic input conditions, and a second operating system corresponding to a second edge compute node includes graphical user interface capabilities to facilitate end-user I/O.

Figure 7:
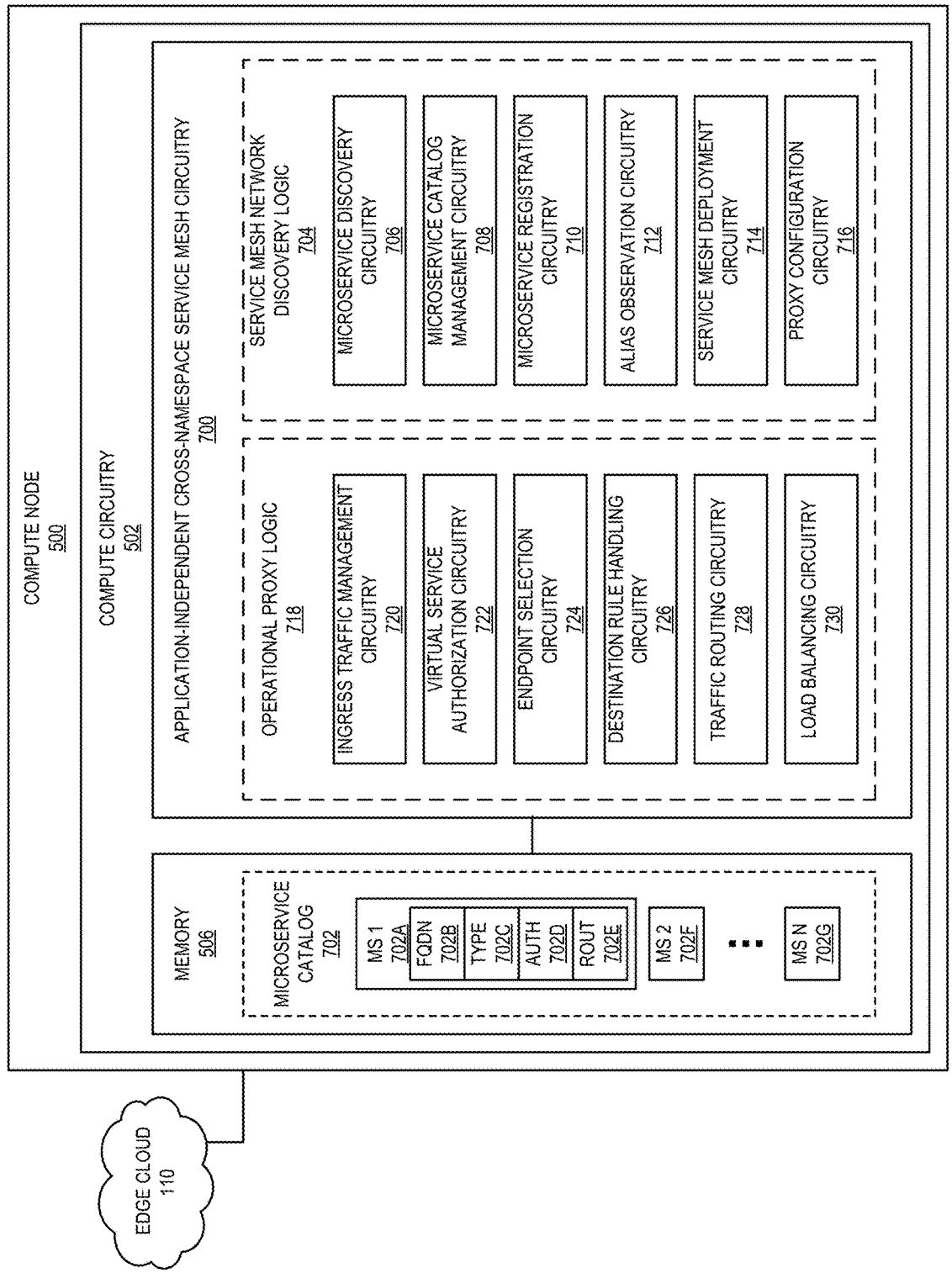
FIG. 7 illustrates an example implementation of a compute node including application-independent cross-namespace service mesh circuitry to implement fine-grained traffic control and connect microservices across namespaces.

FIG. 7 illustrates an example compute node 500 including application-independent cross-namespace service mesh circuitry 700 that facilitates fine-grained traffic control across namespaces and via aliasing. In some examples, the application-independent cross-namespace service mesh circuitry 700 is implemented in hardware as a portion of compute circuitry 502, such as circuitry in an application-specific integrated circuit (ASIC) or any other type of hardware computer circuitry designed for specific tasks. In other examples, the application-independent cross-namespace service mesh circuitry 700 is implemented in software running on the compute circuitry 502 (e.g., compute circuitry 502 may be all or a portion of a general purpose processor). For example, the description of the circuitries within the application-independent cross-namespace service mesh circuitry 700 may be software instantiations of such circuitry. In some examples, the compute circuitry 502 includes a memory 506, which may be dynamic random access memory (DRAM), non-volatile memory, a cache, a buffer in processor circuitry, or any one or more other types of memory capable of providing storage for information/data. Further descriptions and examples of the compute node 500, the compute circuitry 502, and the memory 506 can be found above in the discussion related to FIG. 5. In some examples, the compute node 500 is communicatively coupled to an edge cloud 110 and/or any one or more other types of clouds and/or networks. Further descriptions and examples of the edge cloud 110 can be found above in the discussion related to FIG. 1.

In the illustrated example of FIG. 7, the application-independent cross-namespace service mesh circuitry 700 includes a service mesh network discovery logic 704 series of functions, which includes circuitries that are implemented to perform discovery and configuration operations in the service mesh. In some examples, the discovery and configuration operations include discovery and configurations of endpoints, services/microservices, clusters, edge domain namespaces, as well as discovery and configuration of the proxies that enable communication between such endpoints, services/microservices, clusters, and edge domain namespaces. The service mesh network discovery logic 704 includes example microservice discovery circuitry 706, example microservice catalog management circuitry 708, example microservice registration circuitry 710, example alias observation circuitry 712, example service mesh deployment circuitry 714, and example proxy configuration circuitry 716.

In the illustrated example of FIG. 7, the application-independent cross-namespace service mesh circuitry 700 includes an operational proxy logic 718 series of functions, which includes circuitries that are implemented to perform proxy operations dynamically to handle incoming/ingress traffic events (e.g., requests from users of an application). In some examples, the operational proxy logic 718 functionalities are at least partially dependent upon the service mesh network discovery logic 704 discovering and configuring a proxy to allow performance of the dynamic operational aspects of the proxy. The operational proxy logic 718 includes example ingress traffic management circuitry 720, example virtual service authorization circuitry 722, example endpoint selection circuitry 724, example destination rule handling circuitry 726, example traffic routing circuitry 728, and example load balancing circuitry 730.

Figure 8:
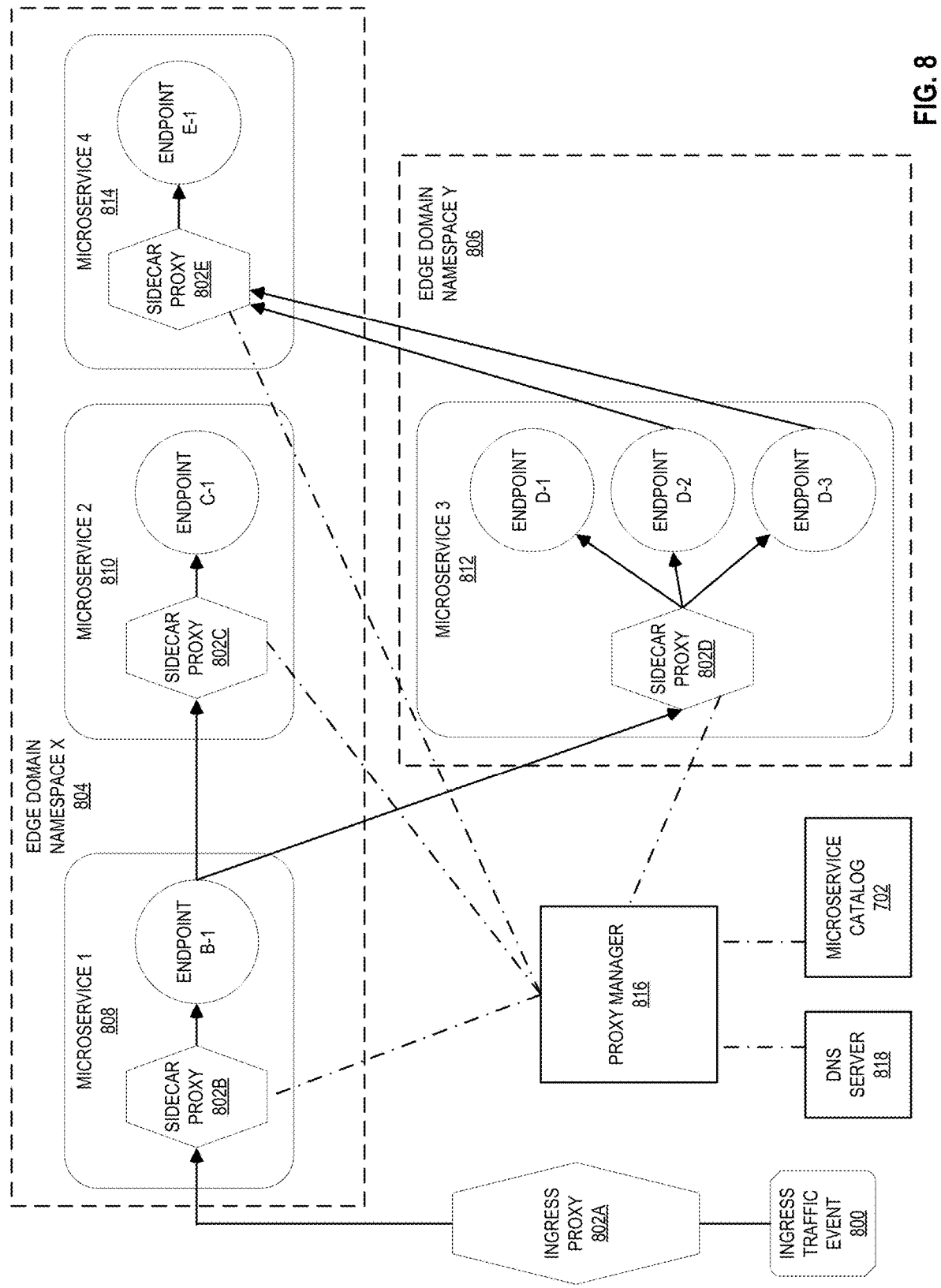
FIG. 8 illustrates an example mesh network process flow responding to an ingress traffic event when implementing one or more proxies enabled by an application-independent cross-namespace service mesh circuitry.

FIG. 8 illustrates an example mesh network process flow responding to an ingress traffic event when implementing one or more proxies enabled by an application-independent cross-namespace service mesh circuitry. FIG. 8 will be utilized as a visual example of the process flow as the functional aspects of the example circuitries illustrated in FIG. 7 are described.

In the illustrated example of FIG. 7, the application-independent cross-namespace service mesh circuitry 700 includes ingress traffic management circuitry 720 as part of the operational proxy logic 718. The example ingress traffic management circuitry 720 receives (e.g., obtains) an ingress traffic event (800 in FIG. 8) from a customer/user, from another remote-namespace service, or from any other entity capable of generating/initiating an ingress traffic event (e.g., on the service mesh data plane). The example ingress traffic management circuitry 720 in FIG. 7 may be operational and/or instantiated (e.g., creating an instance of, bring into being for any length of time, materialize, implement, etc.) in the operational proxy logic 714 running on at least one proxy (e.g., 802A and/or 802B in FIG. 8). In some examples, there are multiple proxies running in the service mesh, including an ingress proxy 802A that obtains/receives ingress traffic events (e.g., ingress traffic event 800) and sends them to one or more edge domain namespaces such as edge domain namespace X 804. The example ingress proxy 802A is operationally running in the service mesh across multiple edge domain namespaces (including edge domain namespace X 804 and edge domain namespace Y 806 in FIG. 8). In some examples, the ingress proxy 802A includes some or all of the operational proxy logic 718, including, for example, ingress traffic management circuitry 720.

Furthermore, in some examples, one or more sidecar proxies (e.g., sidecar proxies 802B, 802C, 802D, and/or 802E are running in the service mesh. In some examples, a sidecar proxy, such as sidecar proxy 802B, is an Envoy proxy in an ISTIO service mesh implementation. Each example sidecar proxy, such as sidecar proxy 802B, is instantiated (e.g., a copy of the proxy is created, such as in a memory, with the relevant information needed for operation and then executed/run) for a given microservice (e.g., sidecar proxy 802B is instantiated for microservice 1 (808), sidecar proxy 802C is instantiated for microservice 2 (810), sidecar proxy 802D is instantiated for microservice 3 (812), and sidecar proxy 802E is instantiated for microservice 4 (814)). In some examples, the proxy manager 816 instantiates each sidecar proxy (e.g., sidecar proxies 802B-E). In other examples, one sidecar proxy is instantiated to provide proxy services across multiple microservices (e.g., such as one sidecar proxy for a cluster of endpoints or one sidecar proxy for an entire edge domain namespace). In some examples, each instantiation of a sidecar proxy such as sidecar proxy 802B includes some or all of the operational proxy logic 718, including, for example, virtual service authorization circuitry 722, endpoint selection circuitry 724, destination rule handling circuitry 726, traffic routing circuitry 728, and/or load balancing circuitry 730. For ease of explanation, the discussion regarding the operational proxy logic 718 within a sidecar proxy can be available in all sidecar proxies, as needed, but will be discussed as it related to a specific sidecar proxy (e.g., sidecar proxy 802B).

In some examples, the ingress traffic event 800 is received at sidecar proxy 802B running to service microservice 1 (808 in FIG. 8) that is being run on endpoint B-1. For example, microservice 1 (808) may be the main webpage of an online retailer and a customer wants to browse for goods that are being sold by the online retailer. In some examples, the main webpage (e.g., portal) is a gateway microservice that processes the incoming customer requests. Sub-pages further within the website that include product descriptions, product reviews, product images, as well as other services such as a shopping cart and checkout service may be provided by additional microservices, such as example microservice 2 (810 in FIG. 8), example microservice 3 (812 in FIG. 8), and/or example microservice 4 (814 in FIG. 8). In some examples, one or more of the microservices providing a resource from a sub-page within the website may be running on another edge domain namespace. For example, the main/front webpage or portal may be provided by microservice 1 (808), running within edge domain namespace X 804, but when a customer arrives and requests to view a specific product, the product page microservice (e.g., microservice 3 (812)) may be hosted by the manufacturer of the product that is in a different edge domain namespace, namely edge domain namespace Y 806.

In some examples, the apparatus includes means for receiving an ingress traffic event. For example, the means for receiving may be implemented by ingress traffic management circuitry 720. In some examples, the ingress traffic management circuitry 720 may be implemented by machine executable instructions such as that implemented by at least block 902 of FIG. 9 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the ingress traffic management circuitry 720 is implemented by other hardware logic circuitry, hardware implemented state machines, and/or any other combination of hardware, software, and/or firmware. For example, the ingress traffic management circuitry 720 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes virtual service authorization circuitry 722 as part of the operational proxy logic 718. In some examples, when an ingress traffic event 800 is received through an ingress proxy 802A into the microservice 1 (808) gateway at sidecar proxy 802B and requests access to information provided at a target (e.g., destination) microservice 3 (812) in edge domain namespace Y 806, the virtual service authorization circuitry 722, running within the operational proxy logic 714 in sidecar proxy 802B performs a look up of an authorization policy to the target microservice (e.g., microservice 3 (812)) in a microservice catalog 702. The performed look up by sidecar proxy 802B determines if the ingress traffic event has authorization/permission to communicate with a microservice in another edge domain namespace. For example, the authorization policy, dictated by microservice 1 (808) and enforced by sidecar proxy 802B, may be to allow any user to access the information. In other examples, the authorization policy may only allow users that have signed in to the initial portal (e.g., a user that has been authenticated as an actual customer with an account with the online retailer hosting microservice 1 (808) to be granted access to the resource(s) provided by microservice 3 (812). Any one or more additional or alternative authorization policies may be present in the microservice catalog 702. In some examples, the set of sidecar proxies shown in FIG. 8 (e.g., sidecar proxies 802B, 802C, 802D, and 802E receive authorization information as to the accessibility of each of the microservices they are supporting through a global authorization table present in the microservice catalog 702. In other examples, the set of sidecar proxies 802B-802E can communicate with each other through one or more channels by knowing of each others' existences in the microservice catalog 702 and may directly inquire about specific authorization requests. For example, an authorization request to access data from microservice 3 is initially received at sidecar proxy 802B running in support of microservice 1 (808). In some examples, the sidecar proxy 802B can send the request to the sidecar proxy 802D and ask to be informed of an authorization as to whether to proceed in routing traffic or denying the request before it is sent further into the service mesh.

In some examples, the microservice catalog 702 is stored in memory 506 within compute circuitry 502 in FIG. 7. In other examples, the microservice catalog 702 is stored elsewhere, such as in memory within the compute node 500 but outside of the compute circuitry 502 or in another storage location local to or remote from the compute node 500. In some examples, the microservice catalog 702 is stored in a database. The database can be implemented in any known database architecture that is functionally sufficient to allow for storage and queries of data. In some examples, the database is stored within memory 506. In some examples, the microservice catalog is a database itself of the information regarding known microservices across edge domain namespaces. In some examples, the microservice catalog includes one or more pieces of information for each microservice and each microservice is a record in the database. For example, a microservice 1 record (e.g., entry) 702A may include a FQDN for the microservice (FQDN 702B), the type of data provided by the microservice (TYPE 702C), one or more authorization policies associated with who/what can access the data/resources supplied by the microservice (AUTH 702D), one or more routing rules associated with how ingress traffic events (e.g., ingress traffic event 800) are to be routed to the target microservice (ROUT 702E), among other information. The example microservice catalog 702 may have a number of microservice records equal to the number of known microservices that have been discovered, such as record MS 1 702A, record MS 2 702F, and up through record MS N 702G.

In some examples, the apparatus includes means for performing a look up of an authorization policy to a target microservice. For example, the means for performing may be implemented by virtual service authorization circuitry 722. In some examples, the virtual service authorization circuitry 722 may be implemented by machine executable instructions such as that implemented by at least block 904 of FIG. 9 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the virtual service authorization circuitry 722 is implemented by other hardware logic circuitry, hardware implemented state machines, and/or any other combination of hardware, software, and/or firmware. For example, the virtual service authorization circuitry 722 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes endpoint selection circuitry 724 as part of the operational proxy logic 718 running in one or more of the sidecar proxies 802B-E. In some examples, in response to a determination that the ingress traffic event 802 (e.g., the customer request) is authorized to access the target microservice, the endpoint selection circuitry 724 selects the second endpoint to service the ingress traffic event 800. In some examples, the selection refers to the sidecar proxy 802B providing a communication connection across the service mesh and across two edge domain namespaces, specifically between microservice 1 (808) and microservice 3 (812). In other examples, the ingress traffic event 800 received at microservice 1 (808) through the sidecar proxy 802B may request access to a microservice (e.g., microservice 2 (810)) that is in the same edge domain namespace (e.g., edge domain namespace X 804) as microservice 1 (812). In some examples, the virtual service authorization circuitry 722 and the endpoint selection circuitry 724 may perform the same example process flow for such a request for communication between two microservices in the same edge domain namespace.

In some examples, the apparatus includes means for selecting a second endpoint to service an ingress traffic event. For example, the means for selecting may be implemented by endpoint selection circuitry 724. In some examples, the endpoint selection circuitry 724 may be implemented by machine executable instructions such as that implemented by at least block 908 of FIG. 9 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the endpoint selection circuitry 724 is implemented by other hardware logic circuitry, hardware implemented state machines, and/or any other combination of hardware, software, and/or firmware. For example, the endpoint selection circuitry 724 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes destination rule handling circuitry 726 as part of the operational proxy logic 718 running as part of one or more of the sidecar proxies 802B-E. In some examples, once the target microservice has been authorized and selected, then the destination rule handling circuitry 726 determines a routing policy to route the ingress traffic to the target microservice. In some examples, the routing policy may include an IP address, such as a FQDN, to access the target microservice (e.g., microservice 3). The example routing policy also may include a time limit for accessing the route, after which the route closes, or it may include a delay set before access opens up (e.g., to manage heavy traffic times). The example routing policy may also include one or more additional IP addresses that provide access to mirrors of target microservice, or the routing policy may include an IP address of an intermediate location hosting a microservice that implements a requestor waiting queue, among other possible routing policy options.

In some examples, the apparatus includes means for determining a routing policy to route the ingress traffic to a target microservice. For example, the means for determining may be implemented by destination rule handling circuitry 726. In some examples, the destination rule handling circuitry 726 may be implemented by machine executable instructions such as that implemented by at least block 1002 of FIG. 10 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the destination rule handling circuitry 726 is implemented by other hardware logic circuitry, hardware implemented state machines, and/or any other combination of hardware, software, and/or firmware. For example, the destination rule handling circuitry 726 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes traffic routing circuitry 728 as part of the operational proxy logic 718 running in one or more of the sidecar proxies 802B-E. In some examples, once the routing policy has been determined with any routing rules, the traffic routing circuitry 728 routes the ingress traffic (e.g., the ingress traffic event 800) to the target microservice in accordance with the routing policy. In some examples, the traffic routing circuitry 728 may send actual requests for moving the information that involves the request across the service mesh (implementing any communication policies that involve cross-edge domain namespace protocols, such as any translation requirements, or the actual transmission of the request). Once the routing process is complete, the example ingress traffic event 800 will have arrived at the target microservice (e.g., microservice 3 (812)).

In some examples, operational proxy logic 718 running in one or more of the sidecar proxies 802B-E and the underlying ingress traffic management circuitry 720, virtual service authorization circuitry 722, endpoint selection circuitry 724, destination rule handling circuitry 726, traffic routing circuitry 728, and load balancing circuitry 730 may operate across edge domain namespaces. Requests for access to other microservices may initiate from any known edge domain namespace and target a microservice in any known edge domain namespace. Thus, the communication among microservices may be in any direction from one such edge domain namespace to another.

For example, the proxy 802 may receive ingress traffic event 800 and provide it to microservice 1 (808) in edge domain namespace X 804. The example ingress traffic event 800 may initially constitute a request to access a target microservice on another edge domain namespace (e.g., target microservice 3 (812) hosted in edge domain namespace Y 806). Once the request reaches microservice 3 (812) the requestor may ask for further resources, which may be provided by microservice 4 (814) hosted on edge domain namespace X 804. Thus, a sidecar proxy, such as sidecar proxy 802D, including the operational proxy logic 718, may then initiate a process flow to provide the requestor, currently being hosted on edge domain namespace Y 806, access back onto edge domain namespace X 804 at endpoint E-1 running microservice 4 (814). In other examples, endpoint E-1 may be located on a third edge domain namespace Z that is separate from edge domain namespace X 804 and edge domain namespace Y 806. In some examples, the one or more sidecar proxies 802B-E may operate on any number of edge domain namespaces.

In some examples, the apparatus includes means for routing the ingress traffic to a target microservice in accordance with a routing policy. For example, the means for routing may be implemented by traffic routing circuitry 728. In some examples, the traffic routing circuitry 728 may be implemented by machine executable instructions such as that implemented by at least block 1004 of FIG. 10 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the traffic routing circuitry 728 is implemented by other hardware logic circuitry, hardware implemented state machines, and/or any other combination of hardware, software, and/or firmware. For example, the traffic routing circuitry 728 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes load balancing circuitry 730 as part of the operational proxy logic 718 running in one or more of the sidecar proxies 802B-E. In some examples, the load balancing circuitry 730 obtains telemetry information corresponding to endpoints in a microservice catalog. In some examples, microservice 3 (812) may be implemented on multiple endpoints available for running the microservice (e.g., endpoint D-1, endpoint D-2, and endpoint D-3). In some examples, such an architectural implementation may allow for fine-tuned load-balancing. There may be a large volume of incoming requests (e.g., ingress traffic event 800), but depending on the nature of the incoming requests, there may be a significant discrepancy between the compute resources needed for one request vs. another request.

For example, in a product page, there may be detailed information on the product, that is accessed, but different requests may be for different specific portions of the detailed information on the product. Thus, a first request just wants access to a written paragraph describing the specifications of the product and a second request may want access to another portion of the available detailed information that is a video showing how to install the product. In a standard round-robin approach to assigning requests across a set of endpoints for the detailed product information, the microservice (e.g., microservice 3 (812)) may be consuming disparate amounts of resources across each of the three endpoints (endpoint D-1, endpoint D-2, and endpoint D-3). Therefore, telemetry services/microservices that monitor the resource constraints of each configured endpoint running the microservice may provide telemetry information such as processor usage rates, memory usage rates, etc. for each endpoint.

Once the telemetry information has been obtained, the load balancing circuitry 730 may balance the load of the received ingress traffic events across endpoints in the microservice catalog based on the telemetry information. More specifically, the load balancing circuitry 730 may balance the load across the three example endpoints (endpoint D-1, endpoint D-2, and endpoint D-3) by selecting the endpoint that has the lowest processor and/or memory utilization rate, among other possible determining factors from telemetry data. In other examples, the load balancing circuitry 730 may provide insight into the loads of each endpoint to an administrator or other human or machine entity charged with maintaining a balanced load of resources, who can change the routing policies accordingly at any particular time in response to the load balancing circuitry 730 load balancing suggestions.

In some examples, the apparatus includes means for balancing a load of received ingress traffic events across endpoints in a microservice catalog based on telemetry information. For example, the means for balancing may be implemented by load balancing circuitry 730. In some examples, the load balancing circuitry 730 may be implemented by machine executable instructions such as that implemented by at least blocks 1302 and 1304 of FIG. 13 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the load balancing circuitry 730 is implemented by other hardware logic circuitry, hardware implemented state machines, and/or any other combination of hardware, software, and/or firmware. For example, the load balancing circuitry 730 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 13:
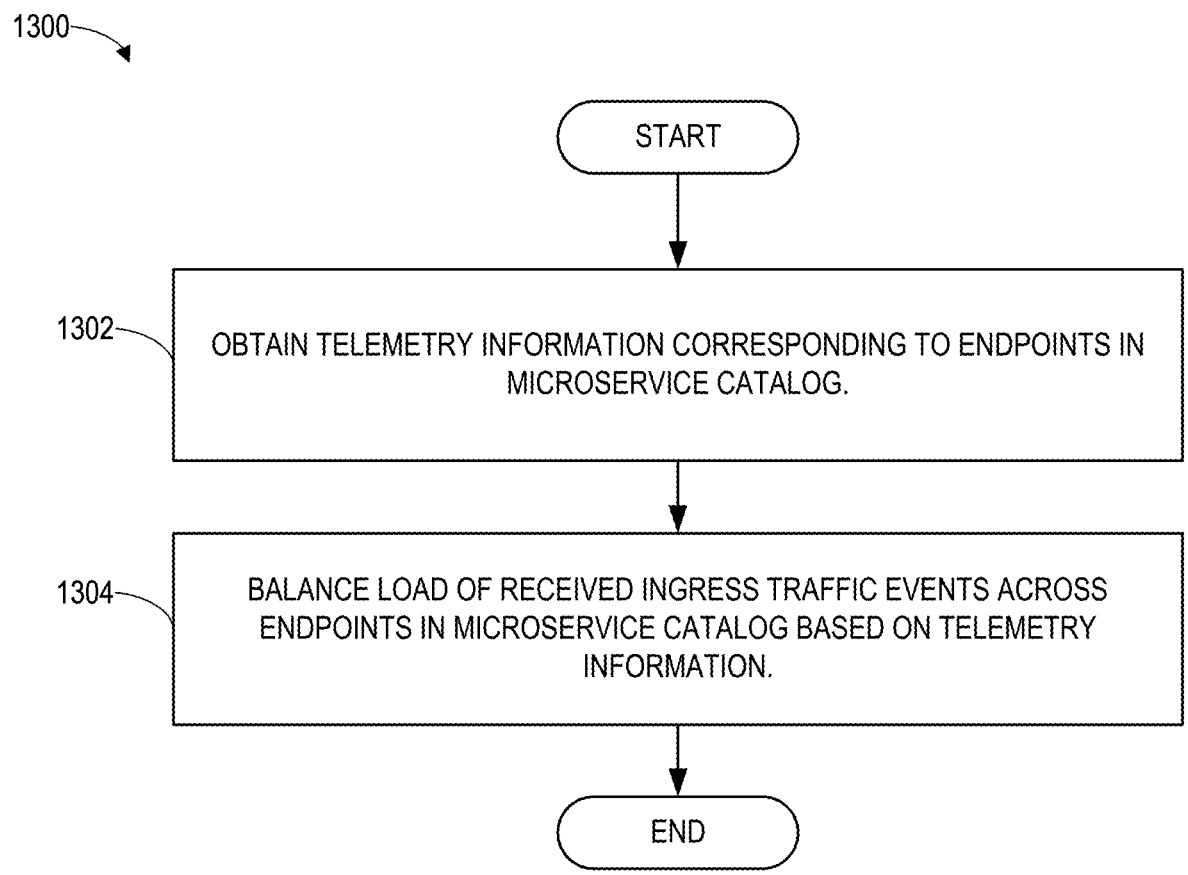
FIG. 13 is a flowchart representative of example machine readable instructions and/or example operations that may be executed and/or instantiated by processor circuitry to perform load balancing of ingress traffic destinations across endpoints.

In some examples, the means for balancing may include means for obtaining telemetry information corresponding to endpoints in a microservice catalog (as shown in block 1302 of FIG. 13 and discussed in the related description).

Apart from the operational proxy logic 718 that provides functional results in a real-time dynamic manner during operation of the service mesh, the application-independent cross-namespace service mesh circuitry 700 also includes a service mesh network discover logic 704 with associated circuitries to allow the discovery and configuration of microservices and endpoints, across multiple edge domain namespaces. In different examples, some or all of the circuitry shown in the operational proxy logic 718 is running in or running as part of at least one of the ingress proxy 802A and/or one or more of the sidecar proxies 802B-E, is running in or running as part of a proxy manager 816, or is running in or running as part of another component in the service mesh. In different examples, some or all of the circuitry shown in the service mesh network discover logic 704 is running in or running as part of one or more sidecar proxies 802B-E, is running in or running as part of a proxy manager 816, or is running in or running as part of another component in the service mesh.

In the illustrated example of FIG. 7, the application-independent cross-namespace service mesh circuitry 700 includes microservice discovery circuitry 706 as part of the service mesh network discovery logic 704. In some examples, the microservice discovery circuitry 706 discovers microservices across edge domain namespaces. Microservice discovery can be implemented in any one of a number of ways. For example, in an ISTIO service mesh, the Pilot component, which is a proxy manager (816 in FIG. 8), consumes information from a service registry (e.g., a listing of available/running services/microservices, also referred to as the microservice catalog 702) and provides a platform-agnostic microservice discovery interface. In some examples, microservices that are running on a compute node 500 (e.g., platform) can be registered with the Pilot component. In some examples, portions or all of the circuitry shown within the service mesh network discovery logic 704 may run in a proxy manager 816. In some examples, once a microservice is registered, a given proxy (e.g., sidecar proxy 802B) can perform microservice discovery, utilizing the microservice catalog 702 to discover an available microservice on another endpoint. In some examples, the microservice discover circuitry 706 operates within a component designed for microservice discovery, such as the Pilot component in ISTIO. In other examples, the microservice discover circuitry 706 may operate as part of a proxy, such as sidecar proxy 802B, or elsewhere on compute resources in a service mesh (e.g., a cluster and/or endpoint dedicated to microservice discovery).

The example proxy manager 816 (e.g., a Pilot component in an ISTIO service mesh) may run within the service mesh or outside of the service mesh with access to the service mesh. In some examples, the proxy manager 816 may run on an endpoint in the service mesh or in a gateway to the service mesh. In different examples, elements of the proxy manager 816 may be distributed or in a single location/endpoint/gateway. In some examples, the proxy manager 816 has communication access (e.g., administrator/super-user/regular-user access) to a DNS server 818, the microservice catalog 702, and each of the one or more sidecar proxies 802B-E the communication access is shown in FIG. 8 by the dash/dot lines coming out of the proxy manager 816 block). In some examples, logic running in the proxy manager 816, such as one or more components within service mesh network discovery logic 704 (in FIG. 7), may remotely cause the functions to take place across the service mesh. For example, the logic within the proxy manager 816 may be running on a given endpoint/gateway/etc. and it may cause the discovery of microservices across one or more domain edge namespaces. In causing such an event to take place, the proxy manager 816 may communicate with additional logic across the mesh network to perform one or more specific operations. Other operations the proxy manager may cause include causing a modification of the microservice catalog, cause registration of a discovered microservice at least by causing configuration of the fully qualified domain name to a domain name system server, cause observation of the domain name system server for at least one alias update to the fully qualified domain name, cause a report of the alias update in response to an observed alias update to the fully qualified domain name, cause deployment of at least an application, one or more microservices associated with the application, and one or more endpoints associated with the one or more microservices, cause a population of the microservice catalog with information associated with at least one of the one or more microservices associated with an application or the one or more endpoints associated with the one or more microservices, and/or cause instantiation of at least one proxy with at least a portion of the information populated in the microservice catalog, among other operations that may be caused by the proxy manager 816. Additionally or alternatively, the proxy manager 816 may directly perform any such operations as those listed above.

In some examples, the apparatus includes means for discovering microservices across edge domain namespaces. For example, the means for discovering may be implemented by microservice discovery circuitry 706. In some examples, the microservice discovery circuitry 706 may be implemented by machine executable instructions such as that implemented by at least block 1102 of FIG. 11 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the microservice discovery circuitry 706 is implemented by other hardware logic circuitry, hardware implemented state machines, and/or any other combination of hardware, software, and/or firmware. For example, the microservice discovery circuitry 706 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes microservice catalog management circuitry 708 as part of the service mesh network discovery logic 704. If In some examples, the microservice catalog management circuitry 708 in the service mesh network discovery logic 704 running on a proxy manager 816 modifies the microservice catalog with information about the discovered microservice. In some examples, the microservice catalog management circuitry 708 updates one or more of the sidecar proxies 802B-E with all microservices domain across the namespaces in a cluster. By updating the proxy, the example microservice catalog management circuitry 708 may specifically update the microservice catalog 702 that lists information regarding the microservices, as discussed above, which is then accessible by a given sidecar proxy (e.g., sidecar proxy 802B) and more specifically by the operational proxy logic 718 running in the example sidecar proxy 802B.

In some examples, the apparatus includes means for modifying a microservice catalog with information about a discovered microservice. For example, the means for modifying may be implemented by microservice catalog management circuitry 708. In some examples, the microservice catalog management circuitry 708 may be implemented by machine executable instructions such as that implemented by at least block 1106 of FIG. 11 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the microservice catalog management circuitry 708 is implemented by other hardware logic circuitry, hardware implemented state machines, and/or any other combination of hardware, software, and/or firmware. For example, the microservice catalog management circuitry 708 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes microservice registration circuitry 710 as part of the service mesh network discovery logic 704. In some examples, the microservice registration circuitry 710 registers a discovered microservice by configuring the fully qualified domain name (FQDN) with the domain name system (DNS) server (818 in FIG. 8) operating as a part of the service mesh. In some examples, the microservice registration circuitry 710 is circuitry under the purview of the operational proxy logic 718, which may run in one or more of the sidecar proxies 802B-E. The example DNS server maintains a list of domain names for endpoints corresponding to the microservices operating across known namespaces. Thus, once the FQDN is registered, proxies operating in the service mesh will have IP address information needed to route a request from an ingress traffic events 800 to the correct microservice (running on an endpoint) across any namespace.

In some examples, the apparatus includes means for registering a discovered microservice by configuring a fully qualified domain name to a domain name system server. For example, the means for registering may be implemented by microservice registration circuitry 710. In some examples, the microservice registration circuitry 710 may be implemented by machine executable instructions such as that implemented by at least block 1108 of FIG. 11 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the microservice registration circuitry 710 is implemented by other hardware logic circuitry, hardware implemented state machines, and/or any other combination of hardware, software, and/or firmware. For example, the microservice registration circuitry 710 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes alias observation circuitry 712 as part of the service mesh network discovery logic 704 running on a proxy manager 816. In some examples, the alias observation circuitry 712 observes the DNS server for a list of aliasing of a microservice's corresponding FQDN.

The example alias observation circuitry 712 determines if there are any alias updates (e.g., an operator updates an alias in the DNS server) based on the observations and, if so, then the alias observation circuitry 712 reports the alias update (e.g., the observed alias) to the microservice catalog management circuitry. In some examples, the microservice catalog management circuitry 708 will modify the microservice catalog 702 with the information about the alias update. In some examples, the information being updated includes adding information to the microservice record of the microservice in question in the microservice catalog 702. For example, the microservice catalog management circuitry 708 may add any additional alias IP addresses corresponding to the FQDN of the microservice so the proxy will have knowledge of all aliases utilized for the microservice.

In some examples, the apparatus includes means for observing a domain name system server for alias updates to fully qualified domain names. For example, the means for observing may be implemented by alias observation circuitry 712. In some examples, the alias observation circuitry 712 may be implemented by machine executable instructions such as that implemented by at least blocks 1202, 1204, and 1206 of FIG. 12 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the alias observation circuitry 712 is implemented by other hardware logic circuitry, hardware implemented state machines, and/or any other combination of hardware, software, and/or firmware. For example, the alias observation circuitry 712 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 12:
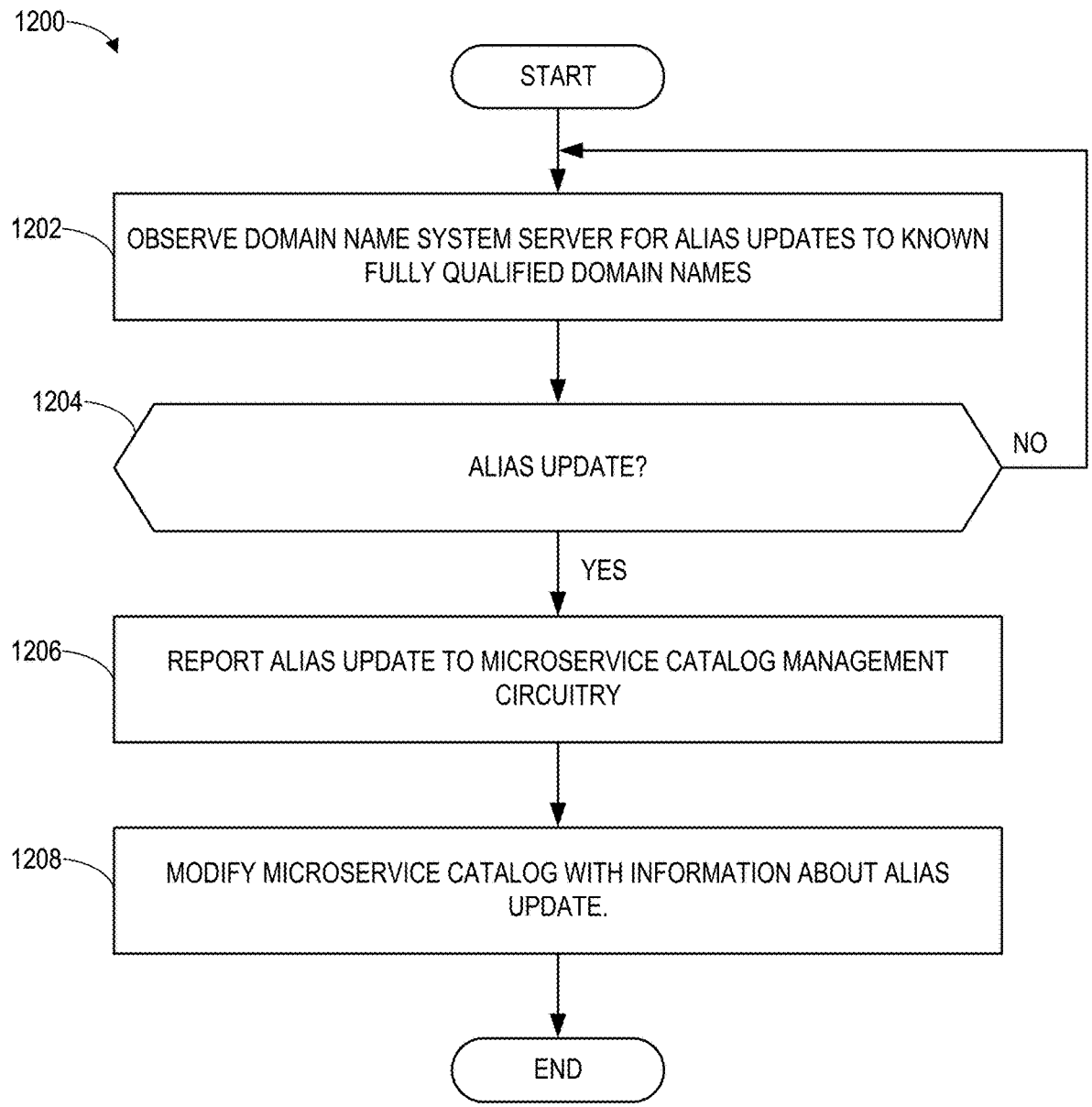
FIG. 12 is a flowchart representative of example machine readable instructions and/or example operations that may be executed and/or instantiated by processor circuitry to observe and respond to alias updates to a domain name system server.

In some examples, the means for observing includes means for reporting an alias update to the microservice catalog management circuitry (as shown in block 1206 of FIG. 12 and discussed in the related description).

In the illustrated example of FIG. 7, the application-independent cross-namespace service mesh circuitry 700 includes service mesh deployment circuitry 714 as part of the service mesh network discovery logic 704. In some examples, the service mesh deployment circuitry 714 deploys an application. With the deployed example application, the service mesh deployment circuitry 714 additionally deploys any microservices associated with the application and configures/deploys any endpoints associated with the microservices. For example, when microservice 4 (814) comes online running on endpoint E-1, the service mesh deployment circuitry 714 deploys everything related to the microservice on the mesh network. For example, the deployment may include setting up a first edge container for the microservice and setting up a second edge container with all needed resources to run the proxy for the microservice.

In some examples, the apparatus includes means for deploying an application, microservices associated with the application, and endpoints associated with the microservices. For example, the means for deploying may be implemented by service mesh deployment circuitry 714. In some examples, the service mesh deployment circuitry 714 may be implemented by machine executable instructions such as that implemented by at least block 1402 of FIG. 14 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the service mesh deployment circuitry 714 is implemented by other hardware logic circuitry, hardware implemented state machines, and/or any other combination of hardware, software, and/or firmware. For example, the service mesh deployment circuitry 714 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 7, the application-independent cross-namespace service mesh circuitry 700 includes proxy configuration circuitry 716 as part of the service mesh network discovery logic 704. In some examples, the proxy configuration circuitry 716 is running on the proxy manager 816. In some examples, once the deployment of the application is completed by the service mesh deployment circuitry 714, then the proxy configuration circuitry populates the microservice catalog 702 with information associated with the microservices (e.g., the microservices relating to the application) and/or the endpoints associated with the microservices. In some examples, the information associated with the microservices include proxy configuration information, routing information, endpoints information, and all domains within the same namespace that the proxy is running on. In some examples, the information for the above listed items may include things such as IP addresses (including FQDNs and aliases) for the microservices, among other information.

In some examples, once the microservice catalog 702 has been populated with all the new information to operate the newly deployed application in the service mesh, then the proxy configuration circuitry 716 can instantiate the proxy (e.g., start the execution of the proxy to perform it's set of tasks, as described above.

In some examples, the apparatus includes means populating a microservice catalog with information associated with deployed microservices and/or endpoints. For example, the means for populating may be implemented by proxy configuration circuitry 716. In some examples, the proxy configuration circuitry 716 may be implemented by machine executable instructions such as that implemented by at least block 1404 and 1406 of FIG. 14 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the proxy configuration circuitry 716 is implemented by other hardware logic circuitry, hardware implemented state machines, and/or any other combination of hardware, software, and/or firmware. For example, the proxy configuration circuitry 716 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 14:
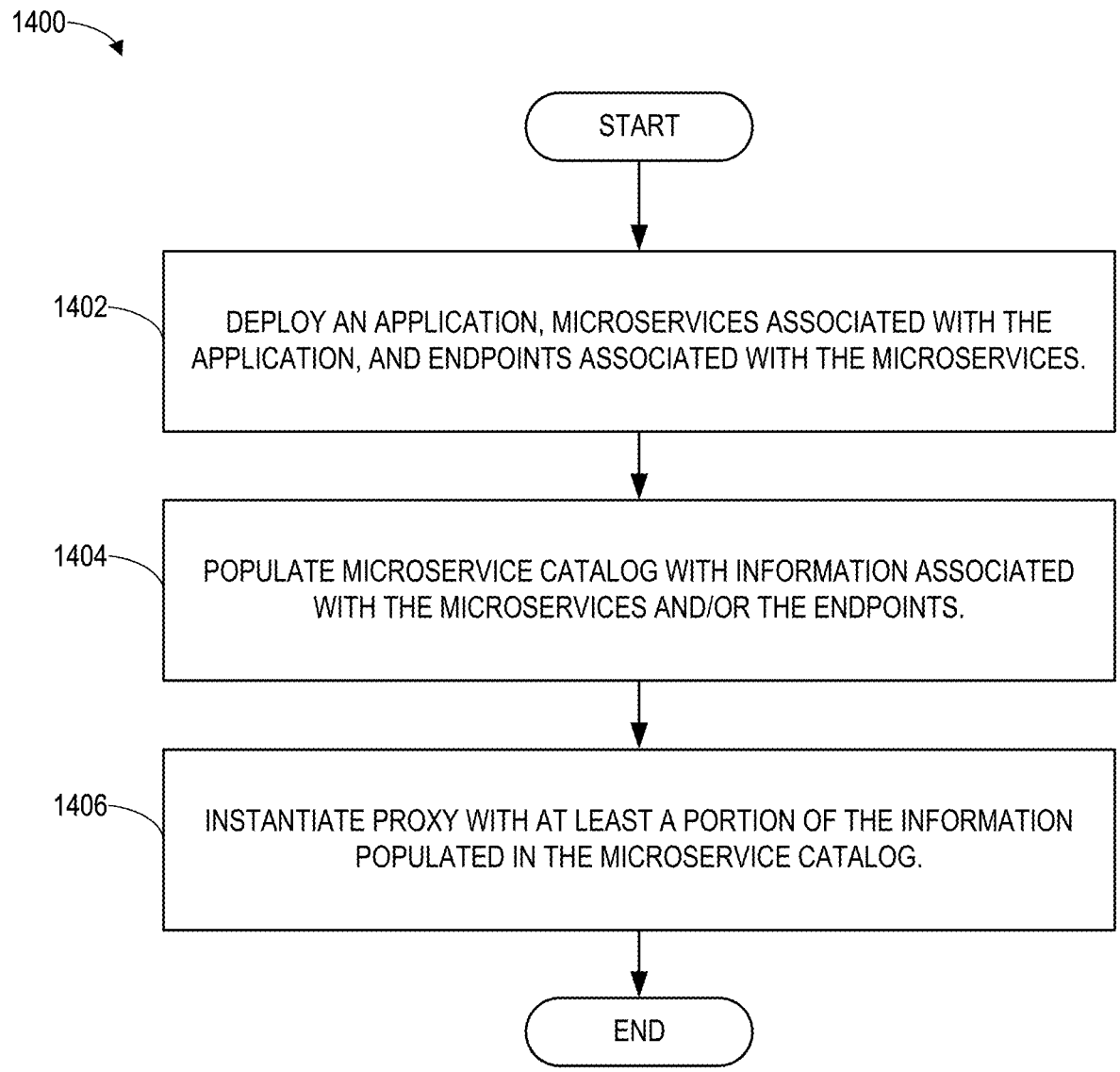
FIG. 14 is a flowchart representative of example machine readable instructions and/or example operations 1400 that may be executed and/or instantiated by processor circuitry to deploy an application with associated microservices and endpoints and instantiate a proxy for the deployed microservices and endpoints associated with the application.

In some examples, the means for populating includes means for instantiating a proxy (as shown in block 1406 of FIG. 14 and discussed in the related description).

While an example manner of implementing the application-independent cross-namespace service mesh circuitry 700 is illustrated in FIG. 7, one or more of the elements, processes, and/or devices illustrated in FIG. 7 may be combined, divided, re-arranged, omitted, eliminated, and/or implemented in any other way. Further, the example microservice discovery circuitry 706, the example microservice catalog management circuitry 708, the example microservice registration circuitry 710, the example alias observation circuitry 712, the example service mesh deployment circuitry 714, the example proxy configuration circuitry 716, the example ingress traffic management circuitry 720, the example virtual service authorization circuitry 722, the example endpoint selection circuitry 724, the example destination rule handling circuitry 726, the example traffic routing circuitry 728, the example load balancing circuitry 730, and/or, more generally, the example application-independent cross-namespace service mesh circuitry 700 of FIG. 7, may be implemented by hardware, software, firmware, and/or any combination of hardware, software, and/or firmware. Thus, for example, any of the example microservice discovery circuitry 706, the example microservice catalog management circuitry 708, the example microservice registration circuitry 710, the example alias observation circuitry 712, the example service mesh deployment circuitry 714, the example proxy configuration circuitry 716, the example ingress traffic management circuitry 720, the example virtual service authorization circuitry 722, the example endpoint selection circuitry 724, the example destination rule handling circuitry 726, the example traffic routing circuitry 728, the example load balancing circuitry 730, and/or, more generally, the example application-independent cross-namespace service mesh circuitry 700, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example application-independent cross-namespace service mesh circuitry 700, the example microservice discovery circuitry 706, the example microservice catalog management circuitry 708, the example microservice registration circuitry 710, the example alias observation circuitry 712, the example service mesh deployment circuitry 714, the example proxy configuration circuitry 716, the example ingress traffic management circuitry 720, the example virtual service authorization circuitry 722, the example endpoint selection circuitry 724, the example destination rule handling circuitry 726, the example traffic routing circuitry 728, and/or the example load balancing circuitry 730 is/are hereby expressly defined to include a non-transitory computer readable storage device or storage disk such as a memory, a digital versatile disk (DVD), a compact disk (CD), a Blu-ray disk, etc., including the software and/or firmware. Further still, the example application-independent cross-namespace service mesh circuitry 700 of FIG. 7 may include one or more elements, processes, and/or devices in addition to, or instead of, those illustrated in FIG. 7, and/or may include more than one of any or all of the illustrated elements, processes and devices.

Flowcharts representative of example hardware logic circuitry, machine readable instructions, hardware implemented state machines, and/or any combination thereof for implementing the application-independent cross-namespace service mesh circuitry 700 of FIG. 7 are shown in FIGS. 9-14. The machine readable instructions may be one or more executable programs or portion(s) of an executable program for execution by processor circuitry, such as the processor circuitry 1512 shown in the example processor platform 1500 discussed below in connection with FIG. 15 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 9-14, many other methods of implementing the example application-independent cross-namespace service mesh circuitry 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-14 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
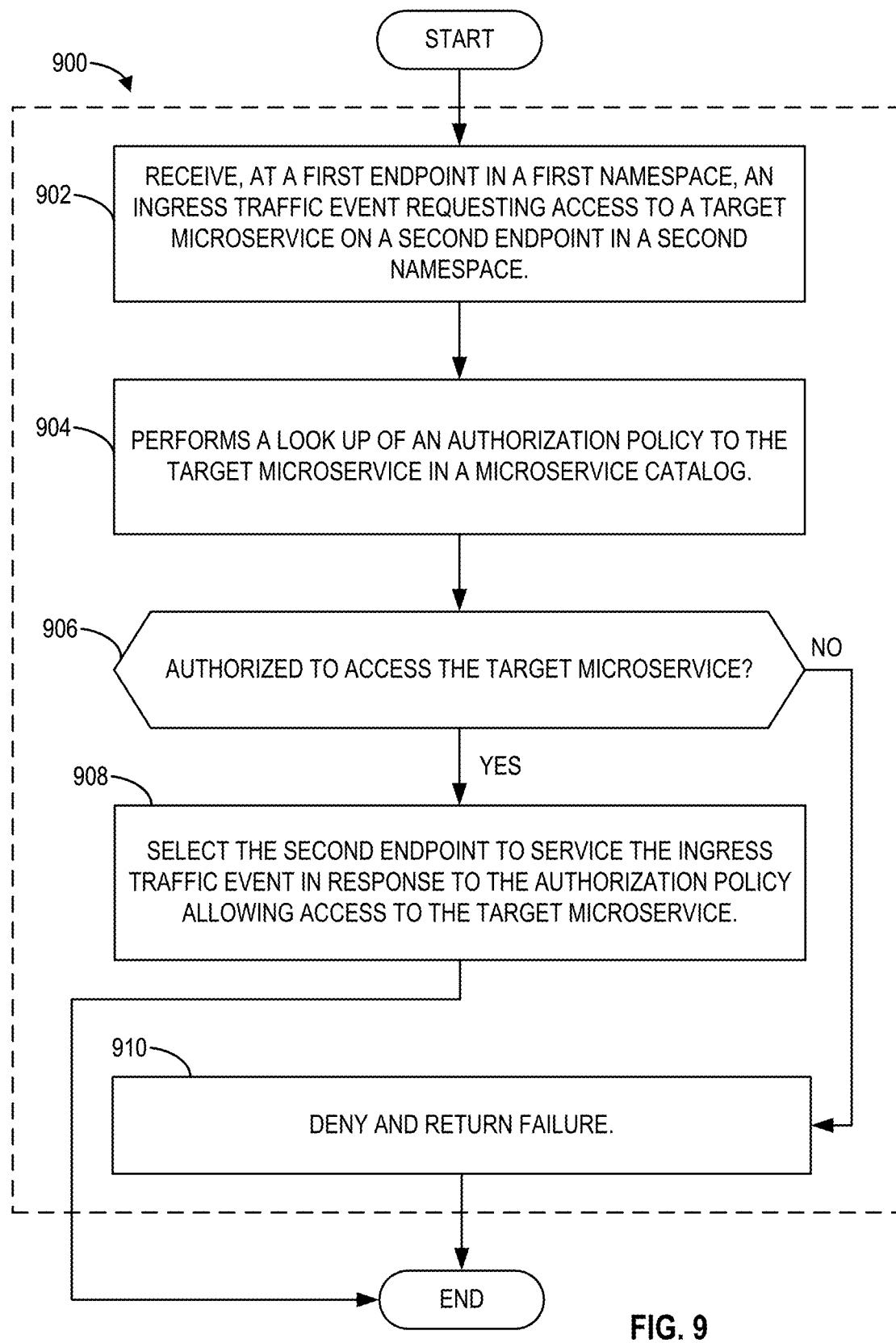
FIG. 9 is a flowchart representative of example machine readable instructions and/or example operations that may be executed and/or instantiated by processor circuitry to preserve fine-grained traffic control capabilities for an application-independent service mesh to connect microservices across edge domain namespaces.

FIG. 9 is a flowchart representative of example machine readable instructions and/or example operations 900 that may be executed and/or instantiated by processor circuitry for traffic control for application-independent service mesh. The machine readable instructions and/or operations 900 of FIG. 9 begin at block 902, at which the ingress traffic management circuitry 720 receives, at a first endpoint in a first namespace, an ingress traffic event requesting access to a target microservice on a second endpoint in a second namespace.

At block 904, the virtual service authorization circuitry 722 performs a look up of an authorization policy to the target microservice in a microservice catalog.

At block 906, the virtual service authorization circuitry 722 allows the process to continue to block 908 in response in response to the authorization policy allowing access to the target microservice. Otherwise, the virtual service authorization circuitry 722, at block 910, denies the access and returns a failure condition to the requestor.

At block 908, in case of an allowance of access to the target microservice, the endpoint selection circuitry 724 selects the second endpoint to service the ingress traffic event in response to the authorization policy allowing access to the target microservice. At this point the process in FIG. 9 finishes.

Figure 10:
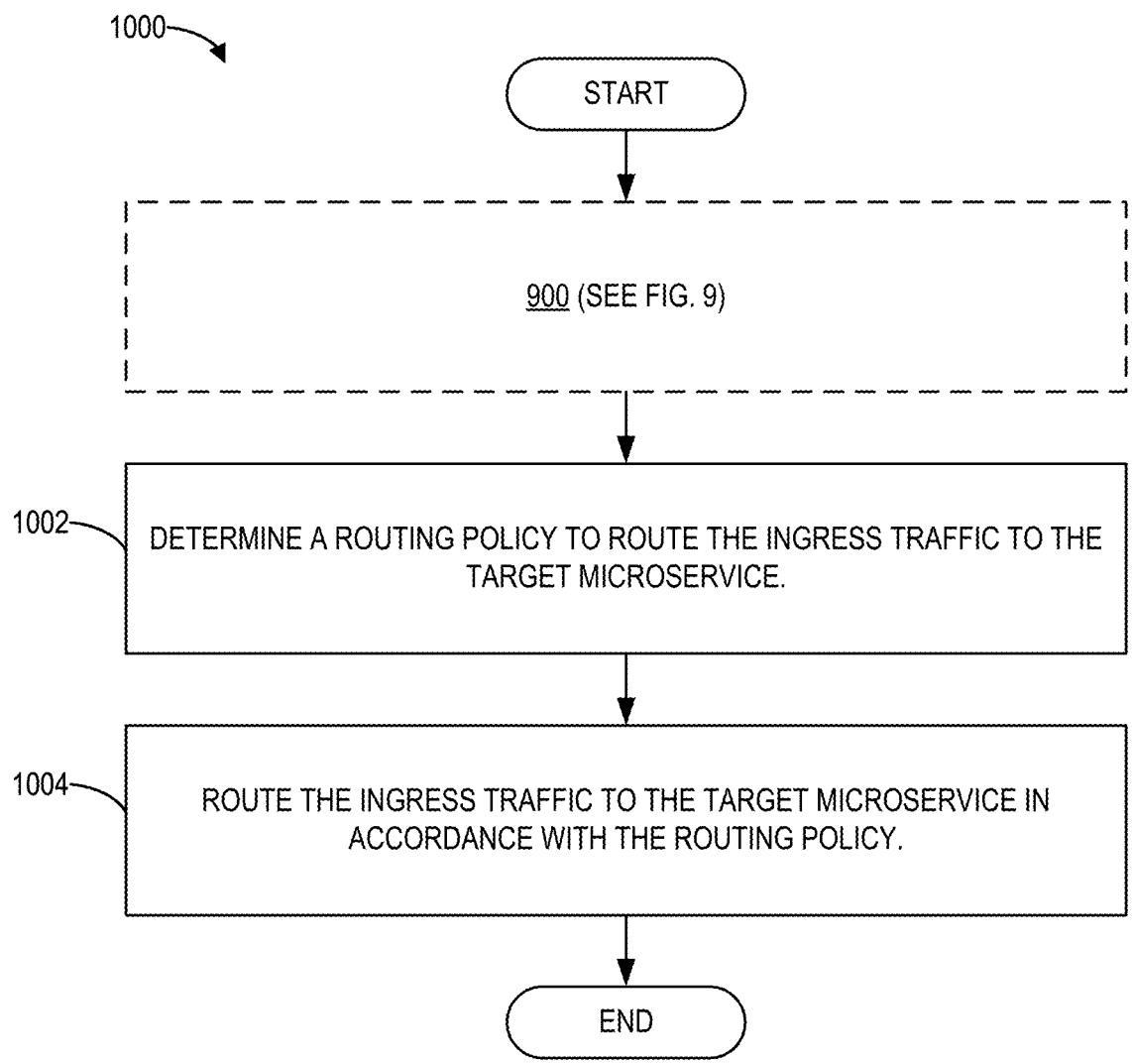
FIG. 10 is a flowchart representative of example machine readable instructions and/or example operations that may be executed and/or instantiated by processor circuitry to route ingress traffic to one or more target microservices.

FIG. 10 is a flowchart representative of example machine readable instructions and/or example operations 1000 that may be executed and/or instantiated by processor circuitry to route ingress traffic to one or more target microservices. The machine readable instructions and/or operations 1000 of FIG. 10 begin at the optional completion of the machine readable instructions and/or operations 900 of FIG. 9. In some examples, the blocks described in FIG. 9 (e.g., 902, 904, and 906) are performed first and as a follow up to their completion, block 1002 is then performed, at which the ingress destination rule handling circuitry 726 determines a routing policy to route the ingress traffic to the target microservice. In other examples, block 1002 may be performed independently of the conclusion of the machine readable instructions and/or operations 900 of FIG. 9.

At block 1004, the traffic routing circuitry 728 routes the ingress traffic to the target microservice in accordance with the routing policy. In some examples, the traffic routing circuitry 728 causes one or more other circuitries/logics in the service mesh (e.g., circuitry/logic in one or more other sidecar proxies 802B-E, one or more service mesh gateways, one or more service mesh endpoints, etc.) to route the traffic in accordance with the routing policy. In some examples, the traffic routing circuitry 728 sends the routing policy to obtained routing policy to one or more sidecar proxies 802B-E, one or more service mesh gateways, one or more service mesh endpoints to have those devices/logics within the service mesh to follow the routing policy when/if the ingress traffic arrives locally at the device/logic. At this point the process in FIG. 10 finishes.

Figure 11:
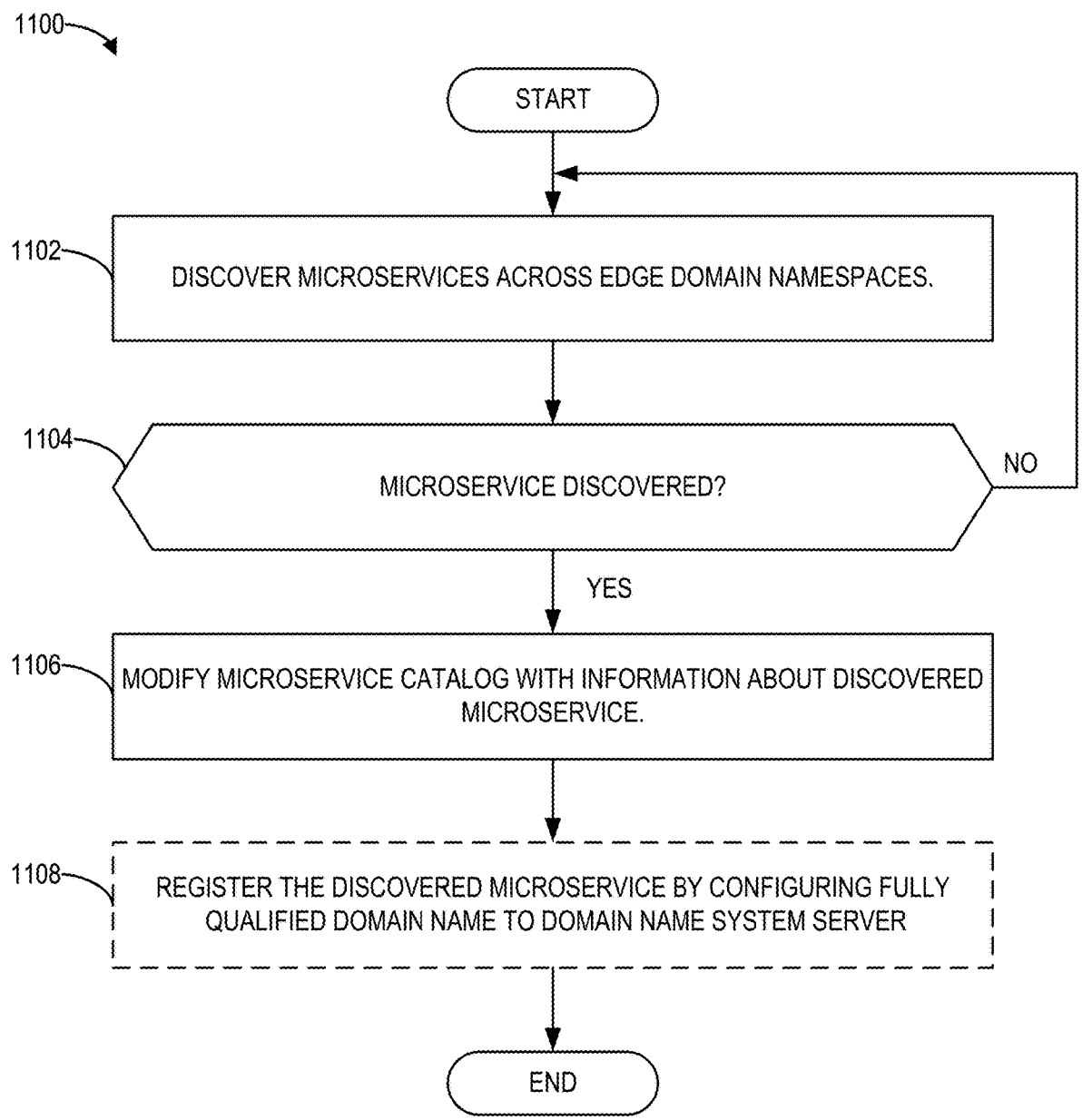
FIG. 11 is a flowchart representative of example machine readable instructions and/or example operations that may be executed and/or instantiated by processor circuitry to discover and register microservices across edge domain namespaces.

FIG. 11 is a flowchart representative of example machine readable instructions and/or example operations 1100 that may be executed and/or instantiated by processor circuitry to discover and register microservices across edge domain namespaces. The machine readable instructions and/or operations 900 of FIG. 9 begin at block 902, at which the ingress traffic management circuitry 720 receives, at a first endpoint in a first namespace, an ingress traffic event requesting access to a target microservice on a second endpoint in a second namespace.

At block 1104, the microservice discovery circuitry 706 allows the process flow to advance to block 1106 in response to a discovered microservice. Otherwise, the process returns to block 1102.

At block 1106, the microservice catalog management circuitry 708 modifies the microservice catalog with information about a discovered microservice. In some examples, the information includes one or more fully qualified domain name addresses, among other items of information (e.g., the name of a microservice, a description of the functionality of the microservice, a listing of additional resources utilized by the microservice, a listing of other microservices that are invoked while using the discovered microservice, etc.).

In some examples, after block 1106 the process in FIG. 11 finishes. In other examples, the process continues at block 1108 where the microservice registration circuitry 710 registers the discovered microservice by sending a fully qualified domain name to the domain name server. In some examples, the fully qualified domain name references the address of the discovered microservice. At this point the process in FIG. 11 finishes.

FIG. 12 is a flowchart representative of example machine readable instructions and/or example operations 1200 that may be executed and/or instantiated by processor circuitry to observe and respond to alias updates to a domain name system server. The machine readable instructions and/or operations 1200 of FIG. 12 begin at block 1202, at which the alias observation circuitry 712 observes a domain name system server for alias updates to known fully qualified domain names. In some examples, each fully qualified domain name represents a microservice or a portion of a microservice.

At block 1204, if the alias observation circuitry 712 does not observe any alias updates, then it continues to observe at block 1202.

Otherwise, if an alias update is observed from the domain name system server, then the alias observation circuitry 712 allows the process flow to continue at block 1206.

In response to an alias update being observed, at block 1206, the alias observation circuitry 712 reports the alias update (e.g., information regarding the alias update including the alias domain name as well as the associated fully qualified domain name) to the microservice catalog management circuitry 708.

At block 1208, the microservice catalog management circuitry 708 modifies the microservice catalog 702 with information about the alias update (e.g., the information provided may include the alias domain name as well as the associated fully qualified domain name). In some examples, a proxy (e.g., sidecar proxy 802B) will load a copy of the microservice catalog 702 into a local memory exclusively for the sidecar proxy 802B for quick access/use. In other examples, the microservice catalog 702 is maintained in a memory/database location shared by all proxies in the service mesh and if information regarding the microservices is needed, a given proxy will read from the shared copy.

In some examples, a microservice catalog management circuitry 708 is present in a sidecar proxy that is performing proxy functions for a corresponding microservice (e.g., sidecar proxy 802B performing proxy functions for microservice 1 (808). If/when the microservice 1 (808) needs to update information regarding the service(s) performed and potentially information related to items stored in the microservice catalog 702 regarding its function(s)/service(s), the sidecar proxy 802B may obtain the local update request and send a communication to the proxy manager 816. In some examples, the proxy manager 816 might send/push an update to the microservice catalog 702 to one or more sidecar proxies (e.g. sidecar proxies 802B-E. In some examples, the sidecar proxies 802B-E pull updates to the microservice catalog 702 from the proxy manager 816 at a regular interval. In some examples, if information in the microservice catalog 702 is changed, a push update is immediately sent from the proxy manager 816 to one or more sidecar proxies 802B-E to notify of an update needed to any local copy of some/all of the information in the microservice catalog 702. In some examples, any current operations utilizing information from the microservice catalog 702 is allowed to finish prior to a local copy update of microservice catalog information. In other examples, to increase resiliency of data, any current operations being performed by one or more of the sidecar proxies 802B-E that utilize information from the microservice catalog 702 are immediately stopped and backed out (and potentially restarted utilizing the new microservice catalog 702 information). In some examples, one or more sidecar proxies 802B-E stores a local copy of some or all of the microservice catalog 702 for use during operations. In other examples, one or more sidecar proxies 802B-E has a pointer to the main/original/global copy of the microservice catalog 702 (e.g., managed by the proxy manager 816) and when information from the microservice catalog 702 is needed, a sidecar proxy 802B-E will remotely read from the microservice catalog 702 or request information in the microservice catalog 702 from the proxy manager 816.

At this point the process in FIG. 12 finishes.

FIG. 13 is a flowchart representative of example machine readable instructions and/or example operations 1300 that may be executed and/or instantiated by processor circuitry to perform load balancing of ingress traffic destinations across endpoints. The machine readable instructions and/or operations 1300 of FIG. 13 begin at block 1302, at which the load balancing circuitry 720 obtains telemetry information corresponding to endpoints in a microservice catalog.

At block 1304, the load balancing circuitry 720 then balances a load of received ingress traffic events across endpoints in the microservice catalog based on the obtained telemetry information. At this point the process in FIG. 13 finishes.

FIG. 14 is a flowchart representative of example machine readable instructions and/or example operations 1400 that may be executed and/or instantiated by processor circuitry to deploy an application with associated microservices and endpoints and instantiate a proxy for the deployed microservices and endpoints associated with the application. The machine readable instructions and/or operations 1400 of FIG. 14 begin at block 1402, at which the service mesh deployment circuitry 714 deploys an application, microservices associated with the application, and endpoints associated with the microservices. In some examples, one or more of the endpoints include one or more edge containers representing decentralized virtual endpoints with all necessary resources to implement the endpoint(s).

At block 1404, the load balancing circuitry 720 then populates the microservice catalog with information associated with the microservices and/or the endpoints.

At block 1406, the proxy configuration circuitry 716 instantiates a proxy for the microservices and/or endpoints associated with the deployed application. In some examples, the proxy configuration circuitry 716 is a traffic management component, such as Pilot in an Istio environment, which manages and configures instances of proxies, including instantiating a proxy when needed. The instantiation process includes At this point the process in FIG. 14 finishes.

Figure 15:
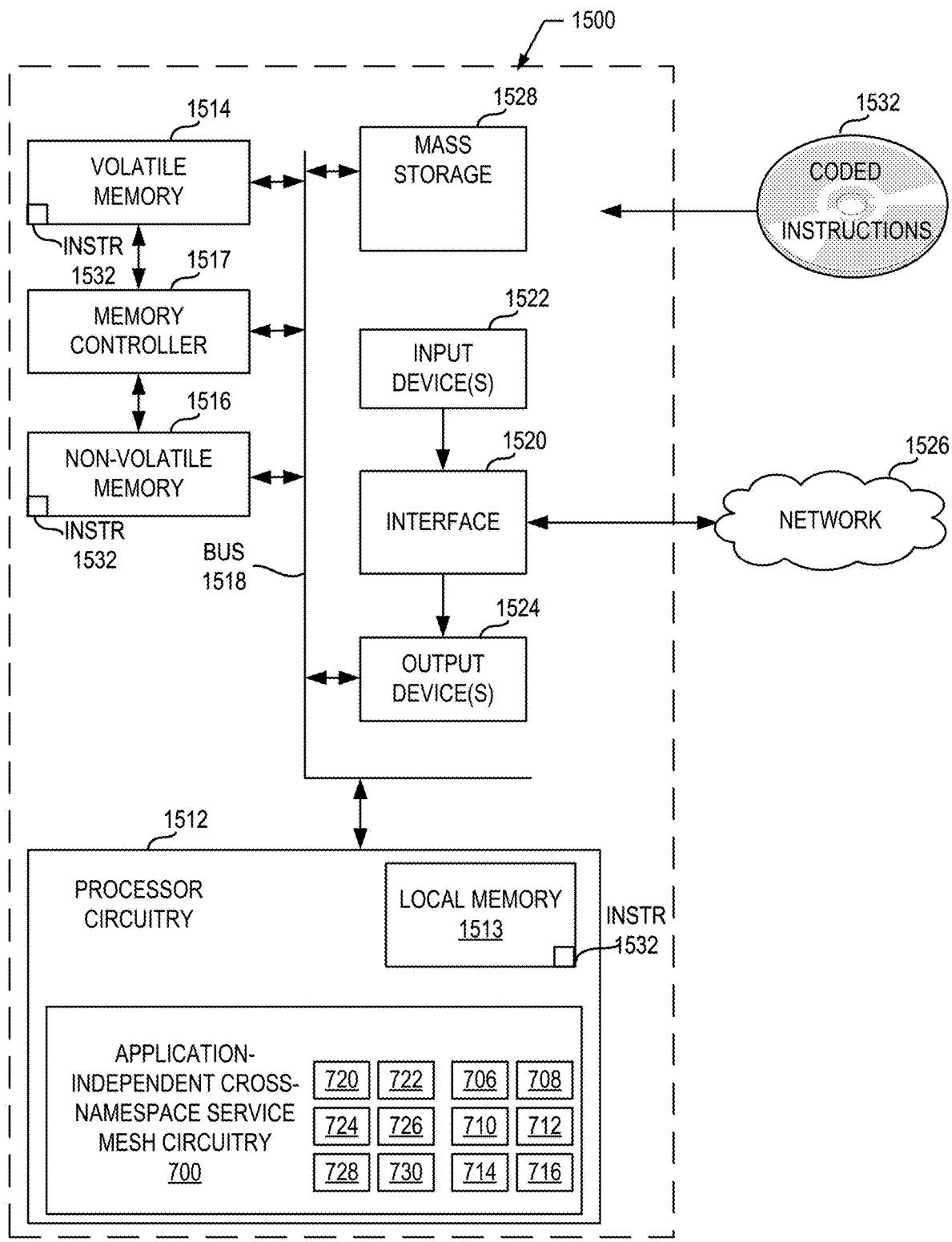
FIG. 15 is a block diagram of an example processing platform including processor circuitry structured to execute the example machine readable instructions of FIGS. 9-14 to implement fine-grained traffic control capabilities for application-independent service mesh to connect microservices across namespaces.

FIG. 15 is a block diagram of an example processor platform 1500 structured to execute and/or instantiate the machine readable instructions and/or operations of FIGS. 9-14 to implement the apparatus of FIG. SSS. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the application-independent cross-namespace service mesh circuitry 700, the microservice discovery circuitry 706, the microservice catalog management circuitry 708, the microservice registration circuitry 710, the alias observation circuitry 712, the service mesh deployment circuitry 714, the proxy configuration circuitry 716, the ingress traffic management circuitry 720, the virtual service authorization circuitry 722, the endpoint selection circuitry 724, the destination rule handling circuitry 726, the traffic routing circuitry 728, and/or the load balancing circuitry 730.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output devices 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1532, which may be implemented by the machine readable instructions of FIGS. 9-14, may be stored in the mass storage device 1528, in the volatile memory 1514, in the non-volatile memory 1516, and/or on a removable non-transitory computer readable storage medium such as a CD or DVD.

Figure 16:
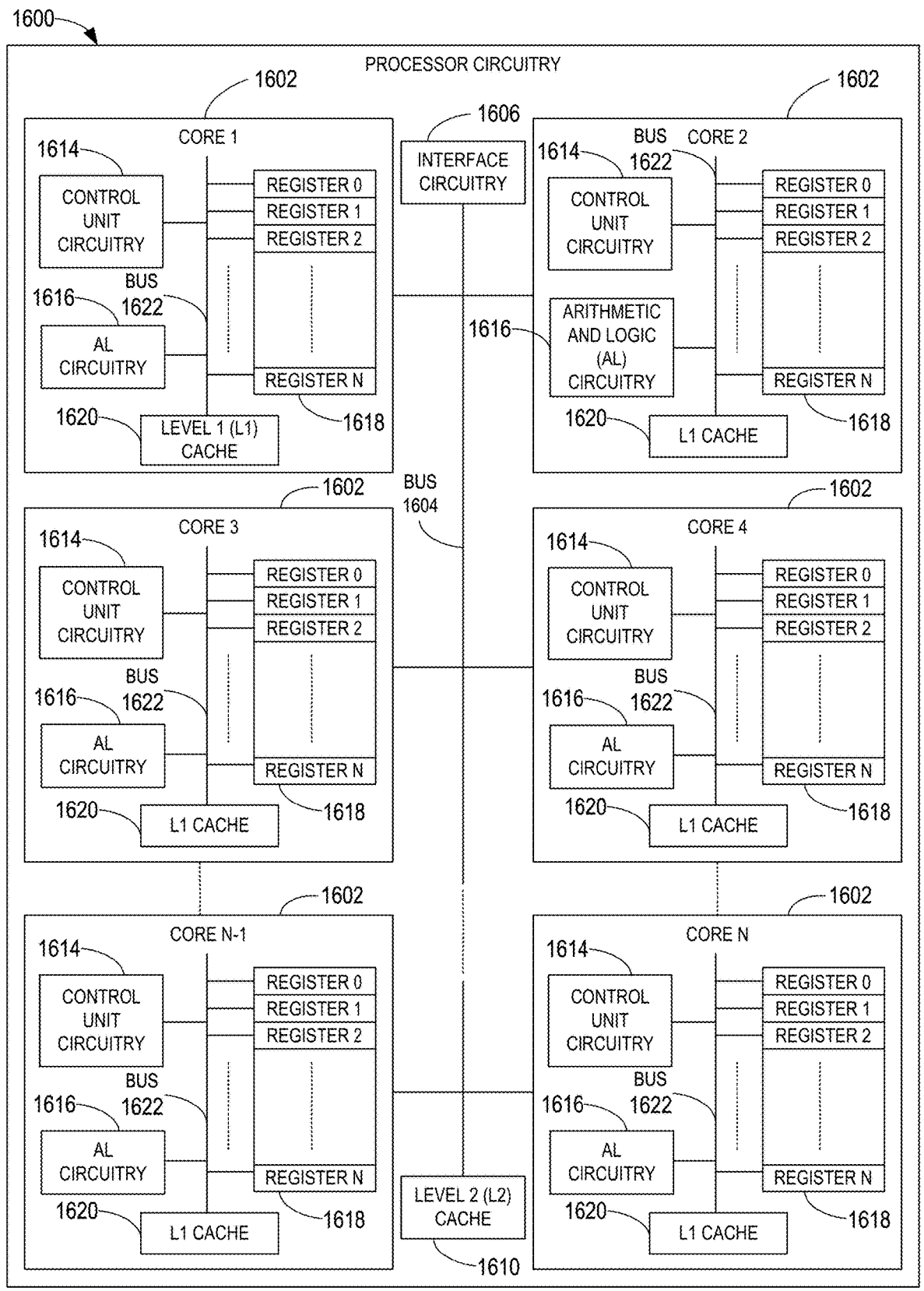
FIG. 16 is a block diagram of an example implementation of the processor circuitry of FIG. 15.

FIG. 16 is a block diagram of an example implementation of the processor circuitry 1512 of FIG. 15. In this example, the processor circuitry 1512 of FIG. 15 is implemented by a microprocessor 1600. For example, the microprocessor 1600 may implement multi-core hardware circuitry such as a CPU, a DSP, a GPU, an XPU, etc. Although it may include any number of example cores 1602 (e.g., 1 core), the microprocessor 1600 of this example is a multi-core semiconductor device including N cores. The cores 1602 of the microprocessor 1600 may operate independently or may cooperate to execute machine readable instructions. For example, machine code corresponding to a firmware program, an embedded software program, or a software program may be executed by one of the cores 1602 or may be executed by multiple ones of the cores 1602 at the same or different times. In some examples, the machine code corresponding to the firmware program, the embedded software program, or the software program is split into threads and executed in parallel by two or more of the cores 1602. The software program may correspond to a portion or all of the machine readable instructions and/or operations represented by the flowcharts of FIGS. 9-14.

The cores 1602 may communicate by an example bus 1604. In some examples, the bus 1604 may implement a communication bus to effectuate communication associated with one(s) of the cores 1602. For example, the bus 1604 may implement at least one of an Inter-Integrated Circuit (I2C) bus, a Serial Peripheral Interface (SPI) bus, a PCI bus, or a PCIe bus. Additionally or alternatively, the bus 1604 may implement any other type of computing or electrical bus. The cores 1602 may obtain data, instructions, and/or signals from one or more external devices by example interface circuitry 1606. The cores 1602 may output data, instructions, and/or signals to the one or more external devices by the interface circuitry 1606. Although the cores 1602 of this example include example local memory 1620 (e.g., Level 1 (L1) cache that may be split into an L1 data cache and an L1 instruction cache), the microprocessor 1600 also includes example shared memory 1610 that may be shared by the cores (e.g., Level 2 (L2_cache)) for high-speed access to data and/or instructions. Data and/or instructions may be transferred (e.g., shared) by writing to and/or reading from the shared memory 1610. The local memory 1620 of each of the cores 1602 and the shared memory 1610 may be part of a hierarchy of storage devices including multiple levels of cache memory and the main memory (e.g., the main memory 1514, 1516 of FIG. 15). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1602 may be referred to as a CPU, DSP, GPU, etc., or any other type of hardware circuitry. Each core 1602 includes control unit circuitry 1614, arithmetic and logic (AL) circuitry (sometimes referred to as an ALU) 1616, a plurality of registers 1618, the L1 cache 1620, and an example bus 1622. Other structures may be present. For example, each core 1602 may include vector unit circuitry, single instruction multiple data (SIMD) unit circuitry, load/store unit (LSU) circuitry, branch/jump unit circuitry, floating-point unit (FPU) circuitry, etc. The control unit circuitry 1614 includes semiconductor-based circuits structured to control (e.g., coordinate) data movement within the corresponding core 1602. The AL circuitry 1616 includes semiconductor-based circuits structured to perform one or more mathematic and/or logic operations on the data within the corresponding core 1602. The AL circuitry 1616 of some examples performs integer based operations. In other examples, the AL circuitry 1616 also performs floating point operations. In yet other examples, the AL circuitry 1616 may include first AL circuitry that performs integer based operations and second AL circuitry that performs floating point operations. In some examples, the AL circuitry 1616 may be referred to as an Arithmetic Logic Unit (ALU). The registers 1618 are semiconductor-based structures to store data and/or instructions such as results of one or more of the operations performed by the AL circuitry 1616 of the corresponding core 1602. For example, the registers 1618 may include vector register(s), SIMD register(s), general purpose register (s), flag register(s), segment register(s), machine specific register(s), instruction pointer register(s), control register(s), debug register(s), memory management register(s), machine check register(s), etc. The registers 1618 may be arranged in a bank as shown in FIG. 16. Alternatively, the registers 1618 may be organized in any other arrangement, format, or structure including distributed throughout the core 1602 to shorten access time. The bus 1620 may implement at least one of an I2C bus, a SPI bus, a PCI bus, or a PCIe bus Each core 1602 and/or, more generally, the microprocessor 1600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 17:
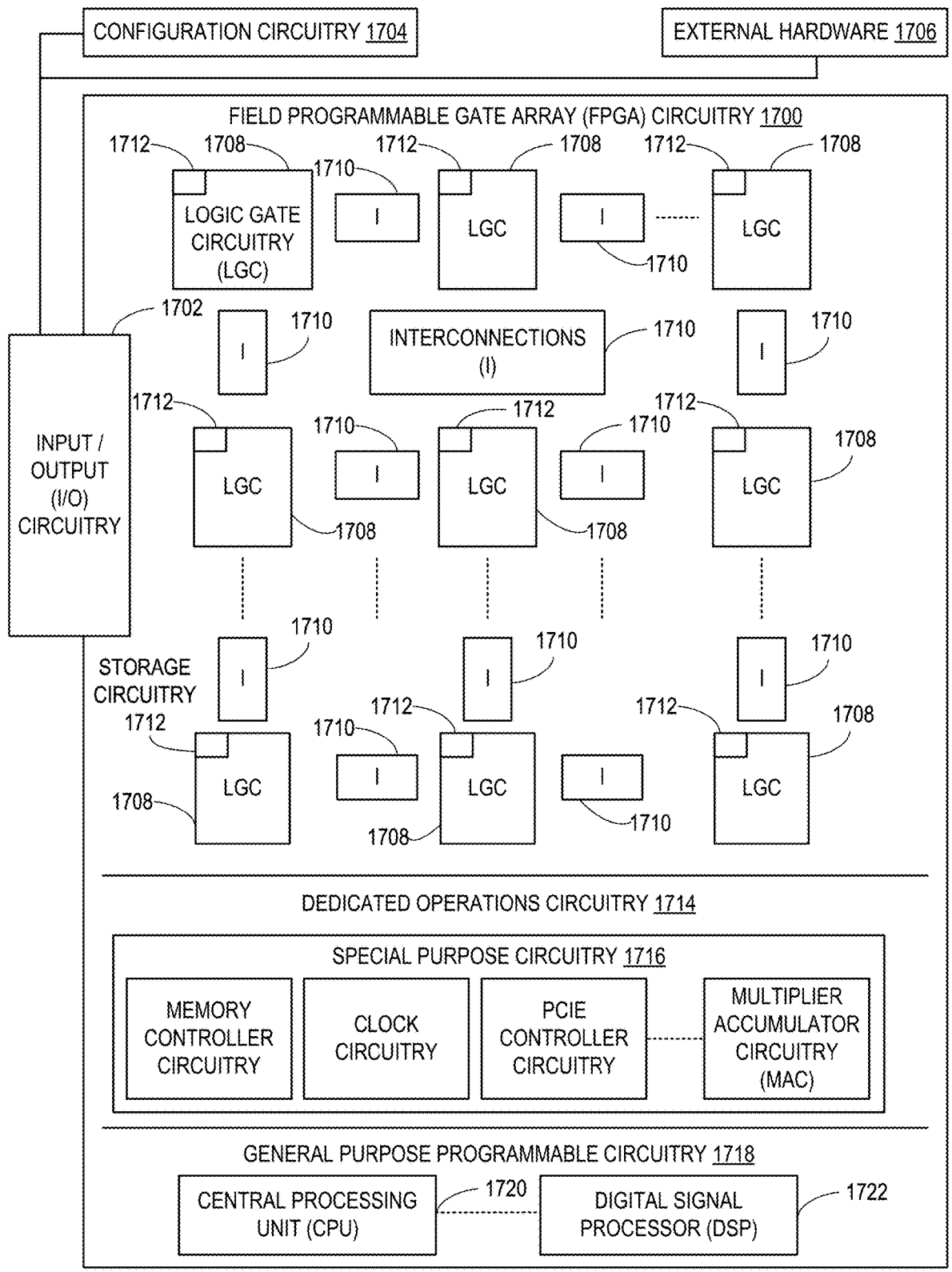
FIG. 17 is a block diagram of another example implementation of the processor circuitry of FIG. 15.

FIG. 17 is a block diagram of another example implementation of the processor circuitry 1512 of FIG. 15. In this example, the processor circuitry 1512 is implemented by FPGA circuitry 1700. The FPGA circuitry 1700 can be used, for example, to perform operations that could otherwise be performed by the example microprocessor 1600 of FIG. 16 executing corresponding machine readable instructions. However, once configured, the FPGA circuitry 1700 instantiates the machine readable instructions in hardware and, thus, can often execute the operations faster than they could be performed by a general purpose microprocessor executing the corresponding software.

More specifically, in contrast to the microprocessor 1600 of FIG. 16 described above (which is a general purpose device that may be programmed to execute some or all of the machine readable instructions represented by the flowcharts of FIGS. 9-14 but whose interconnections and logic circuitry are fixed once fabricated), the FPGA circuitry 1700 of the example of FIG. 17 includes interconnections and logic circuitry that may be configured and/or interconnected in different ways after fabrication to instantiate, for example, some or all of the machine readable instructions represented by the flowcharts of FIGS. 9-14. In particular, the FPGA 1700 may be thought of as an array of logic gates, interconnections, and switches. The switches can be programmed to change how the logic gates are interconnected by the interconnections, effectively forming one or more dedicated logic circuits (unless and until the FPGA circuitry 1700 is reprogrammed). The configured logic circuits enable the logic gates to cooperate in different ways to perform different operations on data received by input circuitry. Those operations may correspond to some or all of the software represented by the flowcharts of FIGS. 9-14. As such, the FPGA circuitry 1700 may be structured to effectively instantiate some or all of the machine readable instructions of the flowcharts of FIGS. 9-14 as dedicated logic circuits to perform the operations corresponding to those software instructions in a dedicated manner analogous to an ASIC. Therefore, the FPGA circuitry 1700 may perform the operations corresponding to the some or all of the machine readable instructions of FIGS. 9-14 faster than the general purpose microprocessor can execute the same.

In the example of FIG. 17, the FPGA circuitry 1700 is structured to be programmed (and/or reprogrammed one or more times) by an end user by a hardware description language (HDL) such as Verilog. The FPGA circuitry 1700 of FIG. 17, includes example input/output (I/O) circuitry 1702 to obtain and/or output data to/from example configuration circuitry 1704 and/or external hardware (e.g., external hardware circuitry) 1706. For example, the configuration circuitry 1704 may implement interface circuitry that may obtain machine readable instructions to configure the FPGA circuitry 1700, or portion(s) thereof. In some such examples, the configuration circuitry 1704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1706 may implement the microprocessor 1600 of FIG. 16. The FPGA circuitry 1700 also includes an array of example logic gate circuitry 1708, a plurality of example configurable interconnections 1710, and example storage circuitry 1712. The logic gate circuitry 1708 and interconnections 1710 are configurable to instantiate one or more operations that may correspond to at least some of the machine readable instructions of FIGS. 9-14 and/or other desired operations. The logic gate circuitry 1708 shown in FIG. 17 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1708 to enable configuration of the electrical structures and/or the logic gates to form circuits to perform desired operations. The logic gate circuitry 1708 may include other electrical structures such as look-up tables (LUTs), registers (e.g., flip-flops or latches), multiplexers, etc.

The interconnections 1710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1708 to program desired logic circuits.

The storage circuitry 1712 of the illustrated example is structured to store result(s) of the one or more of the operations performed by corresponding logic gates. The storage circuitry 1712 may be implemented by registers or the like. In the illustrated example, the storage circuitry 1712 is distributed amongst the logic gate circuitry 1708 to facilitate access and increase execution speed.

The example FPGA circuitry 1700 of FIG. 17 also includes example Dedicated Operations Circuitry 1714. In this example, the Dedicated Operations Circuitry 1714 includes special purpose circuitry 1716 that may be invoked to implement commonly used functions to avoid the need to program those functions in the field. Examples of such special purpose circuitry 1716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1700 may also include example general purpose programmable circuitry 1718 such as an example CPU 1720 and/or an example DSP 1722. Other general purpose programmable circuitry 1718 may additionally or alternatively be present such as a GPU, an XPU, etc., that can be programmed to perform other operations.

Although FIGS. 16 and 17 illustrate two example implementations of the processor circuitry 1512 of FIG. 15, many other approaches are contemplated. For example, as mentioned above, modern FPGA circuitry may include an on-board CPU, such as one or more of the example CPU 1720 of FIG. 17. Therefore, the processor circuitry 1512 of FIG. 15 may additionally be implemented by combining the example microprocessor 1600 of FIG. 16 and the example FPGA circuitry 1700 of FIG. 17. In some such hybrid examples, a first portion of the machine readable instructions represented by the flowcharts of FIGS. 9-14 may be executed by one or more of the cores 1602 of FIG. 16 and a second portion of the machine readable instructions represented by the flowcharts of FIGS. 9-14 may be executed by the FPGA circuitry 1700 of FIG. 17.

In some examples, the processor circuitry 1512 of FIG. 15 may be in one or more packages. For example, the processor circuitry 1600 of FIG. 16 and/or the FPGA circuitry 1700 of FIG. 17 may be in one or more packages. In some examples, an XPU may be implemented by the processor circuitry 1512 of FIG. 15, which may be in one or more packages. For example, the XPU may include a CPU in one package, a DSP in another package, a GPU in yet another package, and an FPGA in still yet another package.

Figure 18:
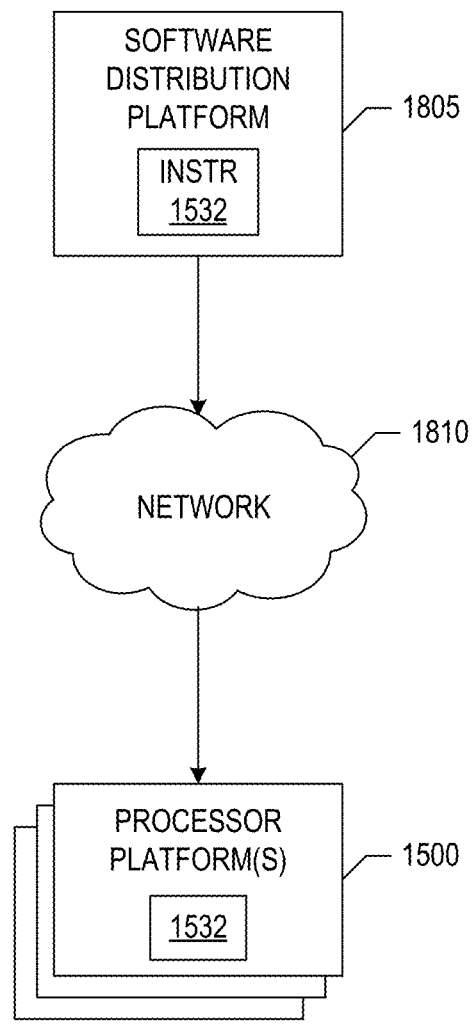
FIG. 18 is a block diagram of an example software distribution platform (e.g., one or more servers) to distribute software (e.g., software corresponding to the example machine readable instructions of FIGS. 9-14) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1805 to distribute software such as the example machine readable instructions 1532 of FIG. 15 to hardware devices owned and/or operated by third parties is illustrated in FIG. 18. The example software distribution platform 1805 may be implemented by any computer server, data facility, cloud service, etc., capable of storing and transmitting software to other computing devices. The third parties may be customers of the entity owning and/or operating the software distribution platform 1805. For example, the entity that owns and/or operates the software distribution platform 1805 may be a developer, a seller, and/or a licensor of software such as the example machine readable instructions 1532 of FIG. 15. The third parties may be consumers, users, retailers, OEMs, etc., who purchase and/or license the software for use and/or re-sale and/or sub-licensing. In the illustrated example, the software distribution platform 1805 includes one or more servers and one or more storage devices. The storage devices store the machine readable instructions 1532, which may correspond to the example machine readable instructions 15 of FIG. 15, as described above. The one or more servers of the example software distribution platform 1805 are in communication with a network 1810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1532 from the software distribution platform 1805. For example, the software, which may correspond to the example machine readable instructions 900, 1000, 1100, 1200, 1300, and/or 1400 of FIGS. 9-14, may be downloaded to the example processor platform 1500, which is to execute the machine readable instructions 1532 to implement the application-independent cross-namespace service mesh circuitry 700. In some example, one or more servers of the software distribution platform 1805 periodically offer, transmit, and/or force updates to the software (e.g., the example machine readable instructions 1532 of FIG. 15) to ensure improvements, patches, updates, etc., are distributed and applied to the software at the end user devices.

APPENDIX—CODE IMPLEMENTATION EXAMPLES

Below is an example of a configuration of an ISTIO virtual service and authorization policy for permission within and across namespaces in a service mesh. The bold/underlined text includes an example of updates to the "VirtualService" and "DestinationRules" resources.

```
Virtual Service:
apiVersion: networking.istio.io/v1beta1
kind: VirtualService
metadata:
    name: reviews-route
spec:
    hosts:
    - reviews.prod.svc.cluster.local
    alias:
    - review.foo.com
    http:
    - name: "reviews-v2-routes"
      match:
        - uri:
            prefix: "/wpcatalog"
        - uri:
            prefix: "/consumercatalog"
      rewrite:
        uri: "/newcatalog"
      route:
        - destination:
            host: reviews.prod.svc.cluster.local
            subset: v2
    - name: "reviews-v1-route"
      route:
        - destination:
            host: reviews.prod.svc.cluster.local
            alias:
              - review.foo.com
            subset: v1
Destination:
apiVersion: networking.istio.io/v1beta1
kind: DestinationRule
metadata:
    name: reviews-destination
spec:
    host: reviews.prod.svc.cluster.local
    or
    alias: review.foo.com
    subsets:
    - name: v1
      labels:
        version: v1
    - name: v2
      labels:
        version: v2
```

Below is an example configuration that shows how a proxy (e.g., Envoy) is populated by the Pilot component in ISTIO across namespaces with domain and endpoints. The bold/underlined text includes an example of additional configuration details to enable the Pilot component to populate a proxy with domains and endpoints across namespaces.

```
#istioctl proxy-config routes productpage-v1-5f8b9d5484-nrs6j --name 9080 -o json
[
    {
        "name": "9080",
        "virtualHosts": [
            {
                "name": "allow_any",
                "domains": [
                    "*"
                ],
                "routes": [
                    {
                        "name": "allow_any",
                        "match": {
                            "prefix": "/"
                        },
                        "route": {
                            "cluster": "PassthroughCluster",
                            "timeout": "0s",
                            "maxGrpcTimeout": "0s"
                        }
                    }
                ],
                "includeRequestAttemptCount": true
            },
            {
                "name": "details.default.svc.cluster.local:9080",
                "domains": [
                    "details.default.svc.cluster.local",
                    "details.default.svc.cluster.local.9080",
                    "details",
                    "details:9080",
                    "details.default.svc.cluster",
                    "details.default.svc.cluster:9080",
                    "details.default.svc",
                    "details.default.svc:9080",
                    "details.default",
                    "details.default:9080",
                    "10.106.146.155",
                    "10.106.146.155:9080"
                ],
                "routes": [
                    {
                        "name": "default",
                        "match": {
                            "prefix": "/"
                        },
                        "route": {
                            "cluster": "outbound|9080||details.default.svc.cluster.local",
                            "timeout": "0s",
                            "retryPolicy": {
                                "retryOn": "connect-failure,refused-stream,unavailable,cancelled,retriable-status-codes",
                                "numRetries": 2,
                                "retryHostPredicate": [
                                    {
                                        "name": "envoy.retry_host_predicates.previous_hosts"
                                    }
                                ],
                                "hostSelectionRetryMaxAttempts": "5",
                                "retriableStatusCodes": [
                                    503
                                ]
                            },
                            "maxGrpcTimeout": "0s"
                        },
                        "decorator": {
                            "operation": "details.default.svc.cluster.local:9080/*"
                        }
                    }
                ],
                "includeRequestAttemptCount": true
            },
            {
                "name": "productpage.default.svc.cluster.local:9080"
                "domains": [
```

```
            "productpage.default.svc.cluster.local",
            "productpage.default.svc.cluster.local:9080",
            "productpage",
            "productpage:9080",
            "productpage.default.svc.cluster",
            "productpage.default.svc.cluster:9080",
            "productpage.default.svc",
            "productpage.default.svc:9080",
            "productpage.default",
            "productpage.default:9080",
            "productpage.com",
            "productpage.com:9080",
            "10.108.90.57",
            "10.108.90.57:9080"
        ],
        "routes": [
            {
                "name": "default",
                "match": {
                    "prefix": "/"
                },
                "route": {
                    "cluster":
"outbound|9080||productpage.default.svc.cluster.local",
                    "timeout": "0s",
                    "retryPolicy": {
                        "retryOn": "connect-failure,refused-
stream,unavailable,cancelled,retriable-status-codes",
                        "numRetries": 2,
                        "retryHostPredicate": [
                            {
                                "name":
"envoy.retry_host_predicates.previous_hosts"
                            }
                        ],
                        "hostSelectionRetryMaxAttempts": "5",
                        "retriableStatusCodes": [
                            503
                        ]
                    },
                    "maxGrpcTimeout": "0s"
                },
                "decorator": {
                    "operation":
"productpage.default.svc.cluster.local:9080/*"
                }
            }
        ],
        "includeRequestAttemptCount": true
    },
    {
        "name": "ratings.default.svc.cluster.local:9080",
        "domains": [
            "ratings.default.svc.cluster.local",
            "ratings.default.svc.cluster.local.9080",
            "ratings",
            "ratings:9080",
            "ratings.default.svc.cluster",
            "ratings.default.svc.cluster:9080",
            "ratings.default.svc",
            "ratings.default.svc:9080",
            "ratings.default",
            "ratings.default:9080",
            "10.97.118.92",
            "10.97.118.92:9080"
        ],
        "routes": [
            {
                "name": "default",
                "match": {
                    "prefix": "/"
                },
                "route": {
                    "cluster":
"outbound|9080||ratings.default.svc.cluster.local",
                    "timeout": "0s",
                    "retryPolicy": {
                        "retryOn": "connect-failure,refused-
stream,unavailable,cancelled,retriable-status-codes",
                        "numRetries": 2,
                        "retryHostPredicate": [
                            {
                                "name":
"envoy.retry_host_predicates.previous_hosts"
                            }
                        ],
                        "hostSelectionRetryMaxAttempts": "5",
                        "retriableStatusCodes": [
                            503
                        ]
                    },
                    "maxGrpcTimeout": "0s"
                },
                "decorator": {
                    "operation":
"ratings.default.svc.cluster.local:9080/*"
                }
            }
        ],
        "includeRequestAttemptCount": true
    },
    {
        "name": "reviews.istio.svc.cluster.local:9080",
        "domains": [
            "reviews.istio.svc.cluster.local",
            "reviews.istio.svc.cluster.local:9080",
            "reviews.istio",
            "reviews.istio:9080",
            "reviews.istio.svc.cluster",
            "reviews.istio.svc.cluster:9080",
            "reviews.istio.svc",
            "foo.com",
            "foo.com:9080",
            "reviews.istio.svc:9080",
            "10.96.49.196",
            "10.96.49.196:9080"
        ],
        "routes": [
            {
                "name": "default",
                "match": {
                    "prefix": "/"
                },
                "route": {
                    "cluster":
"outbound|9080||reviews.istio.svc.cluster.local",
                    "timeout": "0s",
                    "retryPolicy": {
                        "retryOn": "connect-failure,refused-
stream,unavailable,cancelled,retriable-status-codes",
                        "numRetries": 2,
                        "retryHostPredicate": [
                            {
                                "name":
"envoy.retry_host_predicates.previous_hosts"
                            }
                        ],
                        "hostSelectionRetryMaxAttempts": "5",
                        "retriableStatusCodes": [
                            503
                        ]
                    },
                    "maxGrpcTimeout": "0s"
                },
                "decorator": {
                    "operation":
"reviews.istio.svc.cluster.local:9080/*"
                }
            }
        ],
        "includeRequestAttemptCount": true
    }
    ],
    "validateClusters": false
}
]
```

The above example of an enhanced Pilot component (e.g., proxy manager 816) in the ISTIO service mesh is responsible for updating all proxies (e.g., Envoys) associated with or with knowledge of the discovered microservice with routing rules and endpoints. In a resource-constrained edge platform that includes microservices running across namespaces or using aliasing, the example enhanced Pilot component updates the microservice catalog 702 with routing configuration information, the endpoints of the microservices running across namespaces, aliasing information, and ability for an operator or other entity to control the permission/authorization to access the microservice across namespaces or within a namespace.

From the foregoing, it will be appreciated that example systems, methods, apparatus, and articles of manufacture have been disclosed for traffic control for application-independent service mesh. The disclosed systems, methods, apparatus, and articles of manufacture improve the efficiency of using a computing device by enabling the ability for proxies on mesh networks to facilitate direct communication and fine-grained selection of microservices across multiple edge domain namespaces. The disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes At least one non-transitory computer-readable storage medium comprising instructions that, when executed, cause one or more processors of a machine to at least receive ingress traffic events at a first endpoint, at least one of the ingress traffic events to request access to a target microservice running on a second endpoint, perform a look up of an authorization policy for allowing access to the target microservice in a microservice catalog, the microservice catalog to include a list of endpoints of microservices in a service mesh, the list of endpoints including at least the first endpoint in a first edge domain namespace and the second endpoint in a second edge domain namespace, and select the second endpoint to service the ingress traffic event in response to the authorization policy allowing access to the target microservice.

Example 2 includes the at least one non-transitory computer-readable storage medium of example 1, wherein the instructions, when executed, cause the one or more of the processors of the machine to determine a routing policy to route the ingress traffic to the target microservice, and cause routing of the ingress traffic to the target microservice in accordance with the routing policy.

Example 3 includes the at least one non-transitory computer-readable storage medium of example 1, wherein the list of endpoints including at least a third endpoint in a third edge domain namespace, wherein the target microservice is a first target microservice, and wherein the instructions, when executed, cause the one or more of the processors of the machine to request access to a second target microservice during service by the first target microservice, the second target microservice running on the third endpoint, perform a look up of an authorization policy to the second target microservice in the microservice catalog, and select the third endpoint to service the at least one ingress traffic event in response to the authorization policy allowing access to the second target microservice.

Example 4 includes the at least one non-transitory computer-readable storage medium of example 3, wherein the third edge domain namespace is the first edge domain namespace.

Example 5 includes the at least one non-transitory computer-readable storage medium of example 1, wherein the instructions, when executed, cause the one or more of the processors of the machine to cause discovery of microservices across at least the first and second edge domain namespaces, and in response to a discovered microservice, cause a modification of the microservice catalog with information in an entry associated with the discovered microservice, the information including at least a fully qualified domain name corresponding to an endpoint running the discovered microservice.

Example 6 includes the at least one non-transitory computer-readable storage medium of example 5, wherein the instructions, when executed, cause the one or more of the processors of the machine to cause registration of the discovered microservice at least by causing configuration of the fully qualified domain name to a domain name system server.

Example 7 includes the at least one non-transitory computer-readable storage medium of example 6, wherein the instructions, when executed, cause the one or more of the processors of the machine to cause observation of the domain name system server for at least one alias update to the fully qualified domain name, and cause a report of the alias update in response to an observed alias update to the fully qualified domain name.

Example 8 includes the at least one non-transitory computer-readable storage medium of example 1, wherein the instructions, when executed, cause the one or more of the processors of the machine to obtain telemetry information corresponding to a plurality of endpoints in the list of endpoints in the microservice catalog, and balance a load of the received ingress traffic events across the plurality of endpoints in the microservice catalog, based, at least in part, on the obtained telemetry information.

Example 9 includes the at least one non-transitory computer-readable storage medium of example 1, wherein the instructions, when executed, cause the one or more of the processors of the machine to cause deployment of at least an application, one or more microservices associated with the application, and one or more endpoints associated with the one or more microservices, and in response to the deployment of the at least one application, to cause a population of the microservice catalog with information associated with at least one of the one or more microservices associated with the application or the one or more endpoints associated with the one or more microservices, and cause instantiation of at least one proxy with at least a portion of the information populated in the microservice catalog.

Example 10 includes the at least one non-transitory computer-readable storage medium of example 1, wherein the service mesh is an ISTIO service mesh.

Example 11 includes a method, comprising receiving ingress traffic events at a first endpoint, at least one of the ingress traffic events to request access to a target microservice running on a second endpoint, performing a look up of an authorization policy for allowing access to the target microservice in a microservice catalog, the microservice catalog to include a list of endpoints of microservices in a service mesh, the list of endpoints including at least the first endpoint in a first edge domain namespace and the second endpoint in a second edge domain namespace, and selecting the second endpoint to service the ingress traffic event in response to the authorization policy allowing access to the target microservice.

Example 12 includes the method of example 11, further including determining a routing policy to route the ingress traffic to the target microservice, and routing the ingress traffic to the target microservice in accordance with the routing policy.

Example 13 includes the method of example 11, further including discovering microservices across at least the first and second edge domain namespaces, and in response to a discovered microservice, modifying the microservice catalog with information in an entry associated with the discovered microservice, the information including at least a fully qualified domain name corresponding to an endpoint running the discovered microservice.

Example 14 includes the method of example 11, further including deploying at least an application, one or more microservices associated with the application, and one or more endpoints associated with the one or more microservices, and in response to the deployment of the at least one application populating the microservice catalog with information associated with at least one of the one or more microservices associated with the application or the one or more endpoints associated with the one or more microservices, and instantiating at least one proxy with at least a portion of the information populated in the microservice catalog.

Example 15 includes an apparatus, comprising a memory including a microservice catalog, the microservice catalog to include a list of endpoints of microservices in a service mesh, the list of endpoints including at least a first endpoint in a first edge domain namespace and a second endpoint in a second edge domain namespace, and processor circuitry including one or more of at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or an Application Specific Integrate Circuitry (ASIC) including logic gate circuitry to perform one or more third operations, the processor circuitry to perform at least one of the one or more first operations, the one or more second operations or the one or more third operations to instantiate (add def'n) ingress traffic management circuitry to receive ingress traffic events at the first endpoint, at least one of the ingress traffic events to request access to a target microservice running on the second endpoint, virtual service authorization circuitry to perform a look up of an authorization policy for allowing access to the target microservice in the microservice catalog, and endpoint selection circuitry to select the second endpoint to service the ingress traffic event in response to the authorization policy allowing access to the target microservice.

Example 16 includes the apparatus of example 15, wherein at least one of the ingress traffic management circuitry, virtual service authorization circuitry, or the endpoint selection circuitry to execute as at least one proxy.

Example 17 includes the apparatus of example 16, wherein the processor circuitry to perform at least one of the one or more first operations, the one or more second operations or the one or more third operations to instantiate destination rule handling circuitry to determine a routing policy to route the ingress traffic to the target microservice, and traffic routing circuitry to cause routing of the ingress traffic to the target microservice in accordance with the routing policy.

Example 18 includes the apparatus of example 16, wherein the list of endpoints including at least a third endpoint in a third edge domain namespace, wherein the target microservice is a first target microservice, wherein the at least one ingress traffic event requests access to a second target microservice during service by the first target microservice, the second target microservice running on the third endpoint, and wherein the processor circuitry to perform at least one of the one or more first operations, the one or more second operations or the one or more third operations to instantiate the virtual service authorization circuitry to perform a look up of an authorization policy to the second target microservice in the microservice catalog, and the endpoint selection circuitry to select the third endpoint to service the at least one ingress traffic event in response to the authorization policy allowing access to the second target microservice.

Example 19 includes the apparatus of example 18, wherein the third edge domain namespace is the first edge domain namespace.

Example 20 includes the apparatus of example 16, wherein the processor circuitry to perform at least one of the one or more first operations, the one or more second operations or the one or more third operations to instantiate microservice discovery circuitry, to cause discovery of microservices across at least the first and second edge domain namespaces, and microservice catalog management circuitry, in response to a discovered microservice, to cause modification of the microservice catalog with information in an entry associated with the discovered microservice, the information including at least a fully qualified domain name corresponding to an endpoint running the discovered microservice.

Example 21 includes the apparatus of example 20, wherein the processor circuitry to perform at least one of the one or more first operations, the one or more second operations or the one or more third operations to instantiate microservice registration circuitry to cause a registration of the discovered microservice at least by causing a configuration of the fully qualified domain name to a domain name system server.

Example 22 includes the apparatus of example 21, wherein the processor circuitry to perform at least one of the one or more first operations, the one or more second operations or the one or more third operations to instantiate alias observation circuitry to cause observation of the domain name system server for at least one alias update to the fully qualified domain name, and cause a reporting of the alias update to the microservice catalog management circuitry in response to an observed alias update to the fully qualified domain name.

Example 23 includes the apparatus of example 15, wherein the processor circuitry to perform at least one of the one or more first operations, the one or more second operations or the one or more third operations to instantiate load balancing circuitry to obtain telemetry information corresponding to a plurality of endpoints in the list of endpoints in the microservice catalog, and balance a load of the received ingress traffic events across the plurality of endpoints in the microservice catalog, based, at least in part, on the obtained telemetry information.

Example 24 includes the apparatus of example 15, wherein the processor circuitry to perform at least one of the one or more first operations, the one or more second operations or the one or more third operations to instantiate service mesh deployment circuitry to cause a deployment of at least an application, one or more microservices associated with the application, and one or more endpoints associated with the one or more microservices, and proxy configuration circuitry, in response to the deployment of the at least one application, to cause a population of the microservice catalog with information associated with at least one of the one or more microservices associated with the application or the one or more endpoints associated with the one or more microservices, and cause an instantiation of a proxy, the instantiated proxy including at least one of the ingress traffic management circuitry, the virtual service authorization circuitry, or the endpoint selection circuitry.

Example 25 includes the apparatus of example 15, wherein the service mesh is an ISTIO service mesh.

Example 26 includes an apparatus, comprising means for receiving ingress traffic events at a first endpoint, at least one of the ingress traffic events to request access to a target microservice running on a second endpoint, means for performing a look up of an authorization policy for allowing access to the target microservice in a microservice catalog, the microservice catalog to include a list of endpoints of microservices in a service mesh, the list of endpoints including at least the first endpoint in a first edge domain namespace and the second endpoint in a second edge domain namespace, and means for selecting the second endpoint to service the ingress traffic event in response to the authorization policy allowing access to the target microservice.

Example 27 includes the apparatus of example 26, further including means for determining a routing policy to route the ingress traffic to the target microservice, and means for causing the routing of the ingress traffic to the target microservice in accordance with the routing policy.

Example 28 includes the apparatus of example 26, wherein the list of endpoints including at least a third endpoint in a third edge domain namespace, wherein the target microservice is a first target microservice, and further including means for requesting access to a second target microservice during service by the first target microservice, the second target microservice running on the third endpoint, means for performing a look up of an authorization policy to the second target microservice in the microservice catalog, and means for selecting the third endpoint to service the at least one ingress traffic event in response to the authorization policy allowing access to the second target microservice.

Example 29 includes the apparatus of example 28, wherein the third edge domain namespace is the first edge domain namespace.

Example 30 includes the apparatus of example 26, further including means for discovering microservices across at least the first and second edge domain namespaces, and in response to a discovered microservice, means for modifying the microservice catalog with information in an entry associated with the discovered microservice, the information including at least a fully qualified domain name corresponding to an endpoint running the discovered microservice.

Example 31 includes the apparatus of example 30, further including means for registering the discovered microservice at least by causing configuration of the fully qualified domain name to a domain name system server.

Example 32 includes the apparatus of example 31, further including means for observing the domain name system server for at least one alias update to the fully qualified domain name, and means for reporting the alias update in response to an observed alias update to the fully qualified domain name.

Example 33 includes the apparatus of example 26, further including means for obtaining telemetry information corresponding to a plurality of endpoints in the list of endpoints in the microservice catalog, and means for balancing a load of the received ingress traffic events across the plurality of endpoints in the microservice catalog, based, at least in part, on the obtained telemetry information.

Example 34 includes the apparatus of example 26, further including means for deploying at least an application, one or more microservices associated with the application, and one or more endpoints associated with the one or more microservices, and in response to the deployment of the at least one application, to means for populating the microservice catalog with information associated with at least one of the one or more microservices associated with the application or the one or more endpoints associated with the one or more microservices, and means for instantiating at least one proxy with at least a portion of the information populated in the microservice catalog.

Example 35 includes the apparatus of example 26, wherein the service mesh is an ISTIO service mesh.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer-readable storage medium comprising instructions that cause one or more processor circuits of a machine to at least:
   receive, at a first endpoint, an ingress traffic event associated with an entity in a service mesh, the ingress traffic event to request access to a target microservice running on a second endpoint;
   look up an authorization policy associated with the target microservice in a microservice catalog, the authorization policy to govern whether at least the entity is permitted to access the target microservice, the microservice catalog to include a list of endpoints of microservices in the service mesh, the list of endpoints including the first endpoint in a first edge domain namespace and the second endpoint in a second edge domain namespace; and
   select the second endpoint to service the ingress traffic event based on the authorization policy indicating that the entity is permitted to access the target microservice.

2. The at least one non-transitory computer-readable storage medium of claim 1, wherein the instructions cause at least one of the one or more processor circuits of the machine to:
   determine a routing policy to route the ingress traffic event to the target microservice; and
   cause routing of the ingress traffic event to the target microservice in accordance with the routing policy.

3. The at least one non-transitory computer-readable storage medium of claim 1, wherein the authorization policy is a first authorization policy, the list of endpoints includes at least a third endpoint in a third edge domain namespace, the target microservice is a first target microservice, and the instructions cause at least one of the one or more processor circuits of the machine to:

request access to a second target microservice during service by the first target microservice, the second target microservice running on the third endpoint;

look up a second authorization policy associated with the second target microservice in the microservice catalog; and select the third endpoint to service the ingress traffic event based on the second authorization policy permitting access to the second target microservice.

4. The at least one non-transitory computer-readable storage medium of claim 3, wherein the third edge domain namespace is the first edge domain namespace.

5. The at least one non-transitory computer-readable storage medium of claim 1, wherein the instructions cause at least one of the one or more processor circuits of the machine to:

cause discovery of microservices across at least the first edge domain namespace and the second edge domain namespace; and based on a discovered microservice, cause a modification of the microservice catalog with information in an entry associated with the discovered microservice, the information including at least a fully qualified domain name corresponding to an endpoint running the discovered microservice.

6. The at least one non-transitory computer-readable storage medium of claim 5, wherein the instructions cause at least one of the one or more processor circuits of the machine to cause registration of the discovered microservice at least by causing configuration of the fully qualified domain name to a domain name system server.

7. The at least one non-transitory computer-readable storage medium of claim 6, wherein the instructions cause at least one of the one or more processor circuits of the machine to:

cause observation of the domain name system server for at least one alias update to the fully qualified domain name; and cause a report of the alias update based on an observed alias update to the fully qualified domain name.

8. The at least one non-transitory computer-readable storage medium of claim 1, wherein the instructions cause at least one of the one or more processor circuits of the machine to:

obtain telemetry information corresponding to a plurality of endpoints in the list of endpoints in the microservice catalog; and balance a load of ingress traffic events across the plurality of endpoints in the microservice catalog based, at least in part, on the obtained telemetry information.

9. At least one non-transitory computer-readable storage medium comprising instructions that cause one or more processor circuits of a machine to at least:

obtain an ingress traffic event at a first endpoint, the ingress traffic event to request access to a target microservice running on a second endpoint;

based on deployment of an application, cause population of a microservice catalog with information associated with at least one of (a) one or more microservices associated with the application or (b) one or more endpoints associated with the one or more microservices;

perform a look up of an authorization policy for allowing access to the target microservice in the microservice catalog, the microservice catalog to include a list of endpoints of microservices in a service mesh, the list of endpoints including the first endpoint in a first edge domain namespace and the second endpoint in a second edge domain namespace; and select the second endpoint to service the ingress traffic event based on the authorization policy allowing access to the target microservice.

10. The at least one non-transitory computer-readable storage medium of claim 1, wherein the service mesh is an ISTIO service mesh.

11. A method comprising:

receiving, at a first endpoint, an ingress traffic event associated with an entity in a service mesh, the ingress traffic event to request access to a target microservice running on a second endpoint;

searching a microservice catalog for an authorization policy associated with the target microservice, the authorization policy to govern whether at least the entity is permitted to access the target microservice, the microservice catalog to include a list of endpoints of microservices in the service mesh, the list of endpoints including the first endpoint in a first edge domain namespace and the second endpoint in a second edge domain namespace; and selecting the second endpoint to service the ingress traffic event based on the authorization policy indicating that the entity is permitted to access the target microservice.

12. The method of claim 11, further including:

determining a routing policy to route the ingress traffic event to the target microservice; and routing the ingress traffic event to the target microservice in accordance with the routing policy.

13. The method of claim 11, further including:

discovering microservices across at least the first edge domain namespace and the second edge domain namespace; and based on a discovered microservice, modifying the microservice catalog with information in an entry associated with the discovered microservice, the information including at least a fully qualified domain name corresponding to an endpoint running the discovered microservice.

14. The method of claim 11, further including, based on deployment of an applications, populating the microservice catalog with information associated with at least one of (a) one or more microservices associated with the application or (b) one or more endpoints associated with the one or more microservices.

15. An apparatus comprising:

a memory including a microservice catalog, the microservice catalog to include a list of endpoints of microservices in a service mesh, the list of endpoints including a first endpoint in a first edge domain namespace and a second endpoint in a second edge domain namespace; and processor circuitry including one or more of:

at least one of a central processor unit (CPU), a graphic processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus;

a Field Programmable Gate Array (FPGA), the FPGA including first logic gate circuitry, a plurality of configurable interconnections, and storage circuitry, the first logic gate circuitry and the configurable interconnections to perform one or more second operations, the storage circuitry to store a second result of the one or more second operations; or an Application Specific Integrate Circuitry (ASIC) including second logic gate circuitry to perform one or more third operations;

the processor circuitry to perform at least one of the one or more first operations, the one or more second operations, or the one or more third operations to instantiate:

ingress traffic management circuitry to receive, at the first endpoint, an ingress traffic event associated with an entity in the service mesh, the ingress traffic event to request access to a target microservice running on the second endpoint;

virtual service authorization circuitry to look up an authorization policy associated with the target microservice, in the microservice catalog, the authorization policy to govern whether at least the entity is permitted to access the target microservice; and endpoint selection circuitry to select the second endpoint to service the ingress traffic event based on the authorization policy indicating that the entity is permitted to access the target microservice.

16. The apparatus of claim 15, wherein at least one of the ingress traffic management circuitry, the virtual service authorization circuitry, or the endpoint selection circuitry is to execute as at least one proxy.

17. The apparatus of claim 16, wherein the processor circuitry is to perform at least one of the one or more first operations, the one or more second operations, or the one or more third operations to instantiate:

destination rule handling circuitry to determine a routing policy to route the ingress traffic event to the target microservice; and traffic routing circuitry to cause routing of the ingress traffic event to the target microservice in accordance with the routing policy.

18. The apparatus of claim 16, wherein the authorization policy is a first authorization policy, the list of endpoints includes at least a third endpoint in a third edge domain namespace, the target microservice is a first target microservice, the ingress traffic event is to request access to a second target microservice during service by the first target microservice, the second target microservice running on the third endpoint, and the virtual service authorization circuitry is to look up a second authorization policy associated with the second target microservice in the microservice catalog; and the endpoint selection circuitry is to select the third endpoint to service the ingress traffic event based on the second authorization policy permitting access to the second target microservice.

19. The apparatus of claim 18, wherein the third edge domain namespace is the first edge domain namespace.

20. The apparatus of claim 16, wherein the processor circuitry is to perform at least one of the one or more first operations, the one or more second operations, or the one or more third operations to instantiate:

microservice discovery circuitry to cause discovery of microservices across at least the first edge domain namespace and the second edge domain namespace; and microservice catalog management circuitry to, based on a discovered microservice, cause modification of the microservice catalog with information in an entry associated with the discovered microservice, the information including at least a fully qualified domain name corresponding to an endpoint running the discovered microservice.

21. The apparatus of claim 20, wherein the processor circuitry is to perform at least one of the one or more first operations, the one or more second operations, or the one or more third operations to instantiate microservice registration circuitry to cause a registration of the discovered microservice at least by causing a configuration of the fully qualified domain name to a domain name system server.

22. The apparatus of claim 21, wherein the processor circuitry is to perform at least one of the one or more first operations, the one or more second operations, or the one or more third operations to instantiate:

alias observation circuitry to:
cause observation of the domain name system server for at least one alias update to the fully qualified domain name; and
cause a reporting of the alias update to the microservice catalog management circuitry based on an observed alias update to the fully qualified domain name.

23. The apparatus of claim 15, wherein the processor circuitry is to perform at least one of the one or more first operations, the one or more second operations, or the one or more third operations to instantiate:

load balancing circuitry to:
obtain telemetry information corresponding to a plurality of endpoints in the list of endpoints in the microservice catalog; and
balance a load of ingress traffic events across the plurality of endpoints in the microservice catalog based, at least in part, on the obtained telemetry information.

24. The apparatus of claim 15, wherein the processor circuitry to perform at least one of the one or more first operations, the one or more second operations or the one or more third operations to instantiate:

service mesh deployment circuitry to cause a deployment of an application, one or more microservices associated with the application, and one or more endpoints associated with the one or more microservices; and proxy configuration circuitry, based on the deployment of the application, to:
cause a population of the microservice catalog with information associated with at least one of the one or more microservices associated with the application or the one or more endpoints associated with the one or more microservices; and
cause an instantiation of a proxy, the instantiated proxy including at least one of the ingress traffic management circuitry, the virtual service authorization circuitry, or the endpoint selection circuitry.

25. The apparatus of claim 15, wherein the service mesh is an ISTIO service mesh.

* * * * *